United States Patent [19]
Yamamoto et al.

[11] Patent Number: 5,722,299
[45] Date of Patent: Mar. 3, 1998

[54] ADJUSTABLE STEERING COLUMN ASSEMBLY FOR A VEHICLE

[75] Inventors: Yoshimi Yamamoto; Haruhide Kurita, both of Kosai, Japan; Niklas Kjellestrom; Gunnar Eriksson, both of Eskilstuna, Sweden

[73] Assignee: Fuji Kiko Co., Ltd., Tokyo, Japan

[21] Appl. No.: 496,289

[22] Filed: Jun. 29, 1995

[30] Foreign Application Priority Data

Jun. 30, 1994 [JP] Japan ..................... 6-148892
Sep. 13, 1994 [JP] Japan ..................... 6-217767
Sep. 30, 1994 [JP] Japan ..................... 6-236117

[51] Int. Cl.⁶ ........................................... B62D 1/18
[52] U.S. Cl. ........................................ 74/493; 280/775
[58] Field of Search ................. 74/493, 492, 491; 280/775, 777

[56] References Cited

U.S. PATENT DOCUMENTS

| | | | |
|---|---|---|---|
| 4,472,982 | 9/1984 | Nishikawa | 74/493 |
| 4,732,050 | 3/1988 | Vollmer | 74/493 |
| 5,338,064 | 8/1994 | Sadakata et al. | 74/493 |
| 5,461,937 | 10/1995 | Cymbal | 74/493 |
| 5,531,317 | 7/1996 | Tomaru | 74/493 |

FOREIGN PATENT DOCUMENTS

| | | |
|---|---|---|
| 56-33762 | 8/1954 | Japan . |
| 57-35164 | 2/1982 | Japan . |
| 57-142677 | 9/1982 | Japan . |
| 59-43169 | 12/1984 | Japan . |
| 63-25265 | 7/1988 | Japan . |
| 2-33170 | 3/1990 | Japan . |
| 2-721272 | 6/1990 | Japan . |
| 2-234877 | 9/1990 | Japan . |
| 4-35259 | 8/1992 | Japan . |

*Primary Examiner*—Rodney H. Bonck
*Assistant Examiner*—David M. Fenstermacher
*Attorney, Agent, or Firm*—Foley & Lardner

[57] ABSTRACT

A tilting and/or telescopic steering column assembly includes a mounting bracket fixed to a vehicle body, a movable bracket supporting a steering column, a clamping bolt passing through bolt holes of the mounting bracket and movable bracket, and an operating lever for clamping the movable bracket immovable between the left and right side walls of the mounting bracket by turning a clamping nut on the clamping bolt. For tilting and/or telescopic adjustment, the bolt hole of at least one of the mounting and movable brackets is elongated, and fringed with a toothed portion. A lock member is mounted on the clamping bolt, and is formed with a toothed portion for engaging with the toothed portion of the elongate hole. In one practical example, the bolt holes are both elongated and fringed with a toothed portion, and the lock member comprises of a first member for engaging with the toothed portion of the mounting bracket and a second member for engaging with the toothed portion of the movable bracket.

30 Claims, 27 Drawing Sheets

5,722,299

ADJUSTABLE STEERING COLUMN ASSEMBLY FOR A VEHICLE

BACKGROUND OF THE INVENTION

The present invention relates to a mechanism for adjusting the position of a steering wheel for a vehicle, and more specifically to a mechanism for allowing tilting and/or telescopic adjustment of a steering column, and for locking the steering column at an adjusted position with clamping bolt and nut.

One conventional example is shown in FIGS. 40 and 41. A steering column assembly for a vehicle shown in these figures is a tilting and telescopic type enabling the driver to tilt the steering wheel up and down and to shift it back and forth along the axial direction.

The steering column assembly shown in FIGS. 40 and 41 has an upper clamp 1 fixed to the vehicle body, a distance bracket 3 movable up and down between left and right side walls of the upper clamp 1, a jacket tube 4 fixedly mounted on the distance bracket 3, a lower tube 4a nesting axially movably in the jacket tube 4, a flexible lower clamp 5 fixing the lower end of the lower tube 4a to the vehicle body, an axially extensible and compressible steering shaft 6 rotatably supported in said jacket tube 4, and a steering wheel 7 coupled onto the upper end of the steering shaft 6. The upper clamp 1 is formed with left and right side tilt adjustment elongate holes 8, and the distance bracket 3 is formed with left and right telescopic adjustment elongate holes 9 extending in parallel to the axis of the steering shaft 6 and crossing the tile adjustment elongate holes 8 as shown in FIG. 40. A clamping bolt 10 passes through these elongate holes 8 and 9, and a head of the clamping bolt 10 is provided with a member 11 for preventing rotation of the clamping bolt 10. A clamping nut 12 is fixed to one end of an operating lever 13, and screwed on the threaded end of the clamping bolt 10.

When the clamping nut 12 is loosened by turning the operating lever 13, the distance bracket 3 supporting the jacket tube 4 is swingable up and down, and movable axially so that tilt and telescopic adjustment is possible. When the clamping nut 12 is tightened on the clamping bolt 10, the distance bracket 3 is clamped between the left and right side walls of the upper clamp 1, and locked at a desired position with a friction force produced between the upper clamp 1 and the distance bracket 3 by a clamping force of the bolt and nut 10 and 12.

SUMMARY OF THE INVENTION

It is an object of the present invention to improve a steering column assembly of the above-mentioned type using the clamping bolt, and to provide an improved steering column adjusting and locking mechanism which can secure the steering wheel more reliably.

An adjustable steering column assembly according to the present invention, comprises:

first and second bracket members formed, respectively, with first and second bolt holes, one of said first and second bracket members being a mounting bracket member (such as an upper mounting clamp bracket member) adapted to be fixed a vehicle body, and the other of said first and second bracket members being a movable column support member for supporting a steering column, at least one of said first and second bolt holes being an elongate hole for allowing tilting or telescopic adjustment, said elongate hole being accompanied with an adjustment lock toothed portion;

a clamping bolt passing through said first and second bolt holes of said first and second bracket members;

an operating lever member for clamping said movable column support member with said mounting bracket member; and a locking means which is mounted on said clamping bolt and which comprises a locking toothed portion for engaging with said adjustment lock toothed portion of said elongate hole when said operating lever is rotated to clamp said column support bracket with said mounting bracket member.

This mechanism locks the steering column in a desired position not only with the clamping force of the clamping bolt but with the locking engagement between the toothed portions as well.

In a head on collision of the vehicle, the steering wheel receives an impact force due to a secondary collision of the driver against the steering wheel, and this force produce a axial component and a horizontal component because the steering shaft is inclined. As a result, the jacket tube of the steering column tries to move the column supporting bracket member forward and upwardly. Even if such an input force exceeds the clamping force of the clamping bolt, this lock mechanism can further hold the steering wheel still in position with the engagement between the toothed portions. Thus, this mechanism can secure the steering wheel more reliably without need for increasing the clamping force of the clamping bolt.

The lock mechanism of the present invention is advantageous to an air bag system for protection to the driver. The position of the steering wheel is important to the effectiveness of the air bag. If the steering wheel is shifted forward or upward by the collision of the driver, then the air bag cannot provide its intended effect. The lock mechanism of the present invention can hold the steering wheel at the position effectual to the air bag.

The locking means according to the present invention is moved to the lock position automatically with the tightening or clamping operation of the operating lever.

According to a first aspect of the present invention, a steering column assembly for a vehicle, comprises:

a mounting bracket member comprising a tilt adjustment elongate hole for allowing tilt adjustment of a steering column, and a tilt lock toothed portion;

a movable column support member comprising a bolt hole;

a clamping bolt passing through said elongate hole of said mounting bracket member and said bolt hole of said column support member;

a lever member comprising a pushing portion mounted on said clamping bolt for clamping said column support member with said mounting bracket member;

a toothed tilt lock member which is mounted on said clamping bolt and which comprises a toothed portion for engaging with said tilt lock toothed portion of said mounting bracket member; and a resilient member located between said mounting bracket member and said lever member.

For example, the resilient member is disposed between the toothed lock member and the lever member.

When the operating lever is rotated in a loosening direction to loosen the nut, the resilient member abutting on the operating lever rotates together and causes the tilt lock member to rotate together to the unlock position in which the toothed portion of the lock member is disengaged from the tilt lock toothed portion of the mounting bracket member, so that clamping bolt becomes movable up and down in the tilt adjustment elongate hole. When the operating lever is rotated in a tightening direction to tighten the nut, the resilient member abutting on the operating lever rotates with the operating lever and causes the lock member to rotate together to the lock position in which the toothed portion of the lock member engages with the tilt lock toothed portion of the mounting bracket member to make the clamping bolt immovable.

According to a second aspect of the present invention, a steering column assembly for a vehicle, comprises:

a mounting bracket member comprising a tilt adjustment elongate hole for allowing tilt adjustment of a steering wheel, and a tilt lock toothed portion;

a movable column support bracket member comprising a bolt hole;

a clamping bolt passing through said elongate hole of said mounting bracket member and said bolt hole of said movable support member;

a lever member comprising a pushing portion mounted on said clamping bolt for clamping said movable support member with said mounting bracket member; and a toothed tilt lock member which is mounted on said clamping bolt and which comprises a toothed portion for engaging with said tilt lock toothed portion of said mounting bracket member when said movable support member is clamped by said clamping bolt;

wherein said tilt lock member comprises a cam portion and said lever member comprises a cam portion which is engaged with, and disengaged from, said cam portion of said tilt lock member when said lever member is rotated.

According to a third aspect of the present invention, a steering column assembly comprises:

an upper mounting bracket member comprising a bolt hole;

a movable column support bracket member comprising a telescopic adjustment elongate hole for allowing telescopic adjustment of a steering column, and a telescopic lock toothed portion;

a clamping bolt passing through said bolt hole of said mounting bracket member and said telescopic adjustment elongate hole of said column support member;

a lever member comprising a clamping nut screwed on said clamping bolt for clamping said column support member with said mounting bracket member;

a pin holder member which is mounted on said clamping bolt and which comprises a telescopic lock pin which engages with said telescopic lock toothed portion of said movable column support member when said movable support member is clamped by said clamping bolt; and a resilient member located between said pin holder member and said lever member.

When the operating lever is rotated in the loosening direction, the resilient member in sliding contact with the operating lever rotates together and causes the pin holder member to rotate to the unlock position in which the lock pin of the pin holder member is disengaged from the telescopic lock toothed portion of the column support member. When the operating lever is rotated in the tightening direction, the resilient member and the operating lever rotate together and cause the pin holder member to rotate to the lock position in which the lock pin of the pin holder member engages with the telescopic lock toothed portion of the column support member.

According to a fourth aspect of the present invention, a steering column assembly comprising:

an upper mounting clamp bracket member comprising a tilt adjustment elongate hole which is so elongated as to allow tilting adjustment of a steering column, and a tilt lock toothed portion;

a movable column supporting distance bracket member comprising a telescopic adjustment elongate hole which is so elongated as to allow telescopic adjustment of said steering column, and a telescopic lock toothed portion;

a clamping bolt extending from a first bolt end to a second bolt end through said tilt adjustment elongate hole and said telescopic adjustment elongate hole;

an operating lever, mounted on said clamping bolt, for clamping said distance bracket member with said upper mounting clamp bracket member; and a locking means which is mounted on said clamping bolt and which comprises a tilt locking toothed portion for engaging with said tilt lock toothed portion of said upper clamp bracket member, and a telescopic locking toothed portion for engaging with said distance bracket member.

Preferably, said telescopic locking toothed portion of said locking means is movably received in said tilt adjustment elongate hole of said upper mounting clamp bracket member, said telescopic locking toothed portion is moved in an axial direction of said clamping bolt through said tilt adjustment elongate hole into and out of engagement with said telescopic lock toothed portion of said distance bracket member, and said tilt locking toothed portion is movable in said axial direction of said clamping bolt, into and out of engagement with said tilt lock toothed portion.

DETAILED DESCRIPTION OF THE INVENTION

First Embodiment

Figure 1:
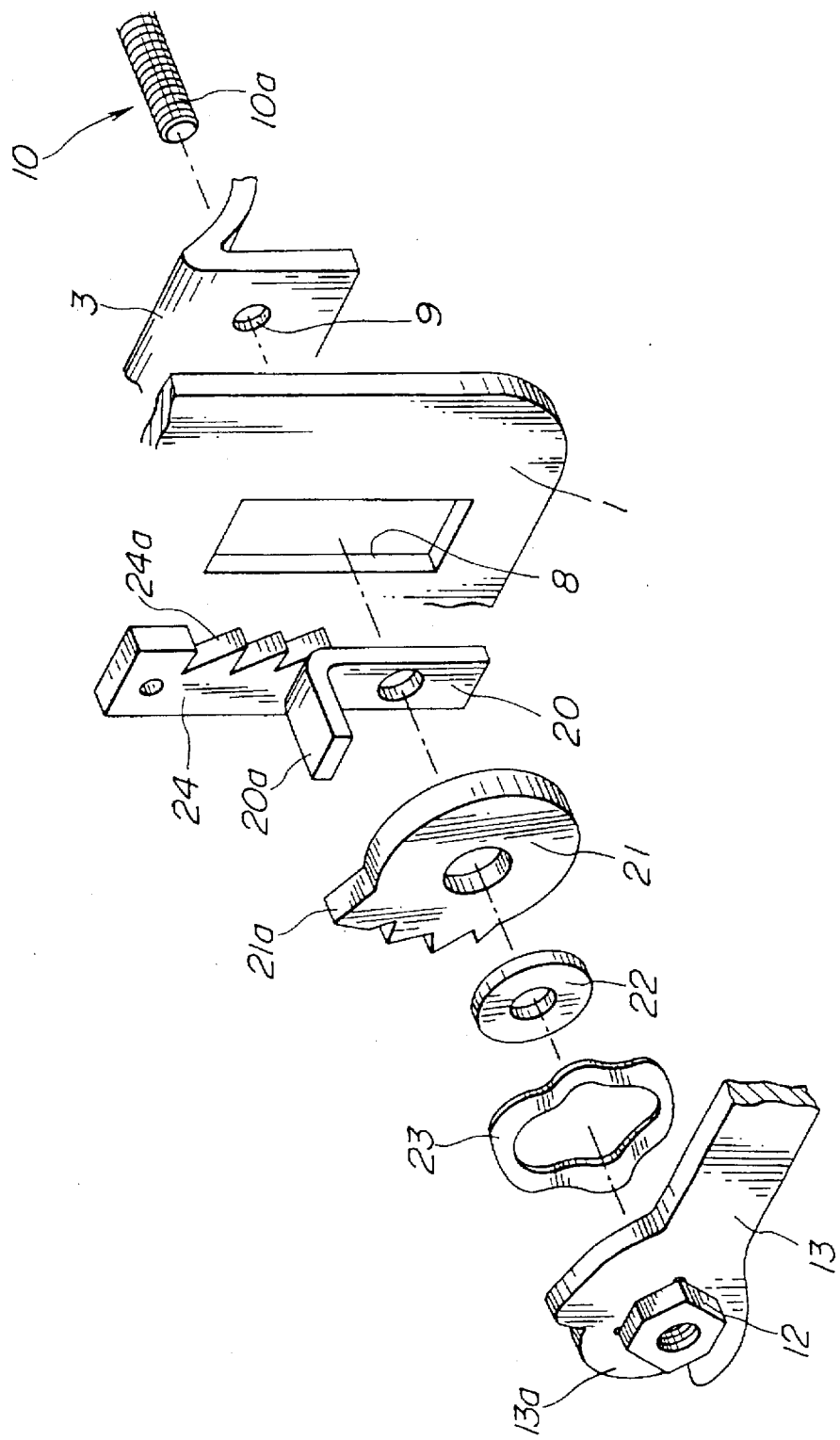
FIG. 1 is an exploded perspective view of a part of a tilt lock mechanism according to a first embodiment of the present invention.
Figure 2:
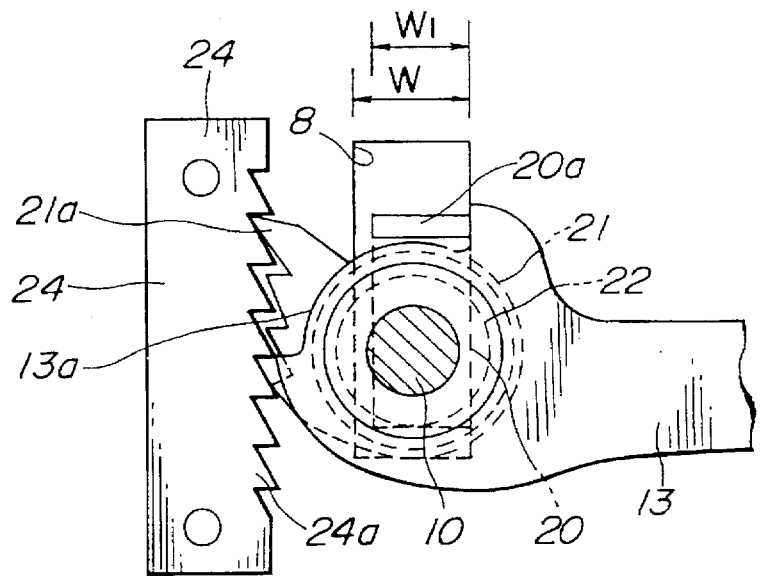
FIG. 2 is a side view of the tilt lock mechanism shown in FIG. 1.
Figure 3:
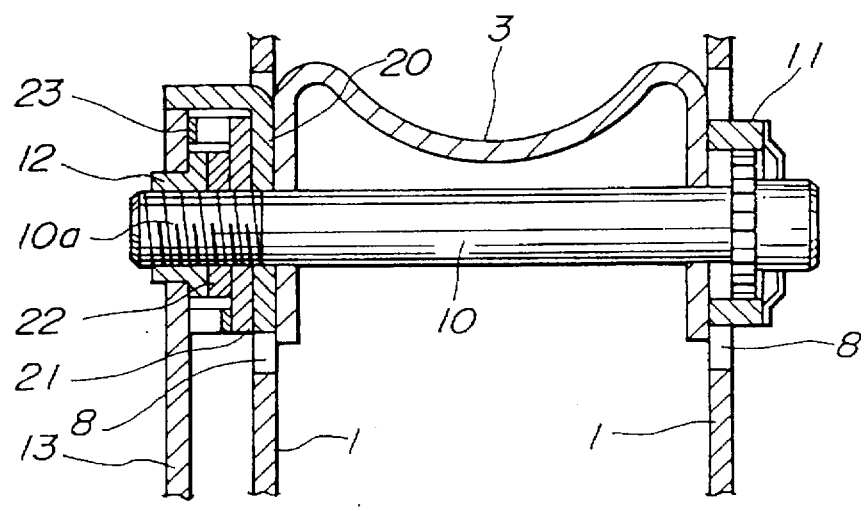
FIG. 3 is a sectional view of the tilt lock mechanism of FIG. 1.

FIGS. 1–3 show a tilt lock mechanism for a steering column according to a first embodiment of the present invention.

The steering column adjusting mechanism of this example includes at least a stopper lever (or stopper plate) 20 movably received in a tilt adjustment elongate hole 8 of an upper clamp bracket (or upper mounting bracket) 1, a tilt lock plate 21 abutting on the stopper lever 20, a washer 22 abutting on the tilt lock plate 21, and a wave washer (resilient member) 23 abutting on the tilt lock plate 21. These members 20, 21, 22 and 23 are all loosely mounted on a clamping bolt (tilt bolt) 10. The washer 22 is received in a hole of the wave washer 23. The stopper lever 20 is movable up and down in the tilt adjustment elongate hole 8. A threaded portion 10a of the clamping bolt 10 is screwed into a clamping nut 12 of an operating lever (tilt lever) 13. A toothed plate 24 is fixed to the upper clamp bracket 1 near and along the tilt adjustment elongate hole 8.

The upper clamp bracket 1 of this example has first and second (left and right) side walls (or arms) which are in the form of two parallel flat plates. A distance bracket (or movable column support bracket) 3 is supported between the left and right side walls of the upper clamp bracket 1. Each of the first and second side walls of the upper clamp bracket 1 is formed with the tilt adjustment hole 8 elongated in an approximately vertical direction for allowing tilt movement of the steering column. The operating lever 13 is on the first side of the upper clamp bracket 1, and in this example, the first side is the left side.

The stopper lever 20 is received in the tilt adjustment elongate hole 8 of the left (first) side wall of the upper clamp bracket 1 in such a manner that the stopper lever 20 is movable up and down in the left (first) side elongate hole 8. The stopper lever 20 is an L-shaped plate having a vertical portion and an upper horizontal stopper portion 20a projecting from the upper end of the vertical portion. As shown in FIG. 2, the width W1 of the stopper lever 20 is slightly smaller than the width W of the elongate hole 8 receiving the stopper plate 20. As shown in FIG. 3, the upper horizontal stopper portion 20a of the stopper lever 20 projects in a direction perpendicular to the first (left) side platelike wall of the upper clamp bracket 1, toward the operating lever 13.

The operating lever 13 has a first lever end formed with an arc portion 13a having a surface which is a part of a curved surface of an imaginary cylinder coaxial with the clamping bolt 10. The curved surface of the arc portion 13a extends like a segment of a circle between two end surfaces projecting radially outwardly. The stopper portion 20a of the stopper lever 20 slides on the arc portion 13a of the operating lever 13, and limits the rotational movement of the operating lever by abutting against one of the end surfaces at the ends of the arc portion 13a.

The toothed plate 24 fixed to the clamp bracket 1 is formed with a toothed portion 24a. As shown in FIGS. 1 and 2, the toothed portion 24a has teeth which are formed in a flat end surface which is perpendicular to the outside surface of the left side wall of the upper clamp bracket 1, and which are spaced along a straight line parallel to the longitudinal direction of the elongate hole 8, like a rack. The tilt lock plate 21 has a tilt lock toothed portion 21a adapted to engage with the toothed portion 24a of the toothed plate 24. The wave washer (resilient member) 23 is designed to produce a force trying to move the stopper lever 20 away from the operating lever 13, that is, the clamping nut 12. The resilient member that is the wave washer 23 in this example always pushes the tilt lock plate 21 to the upper clamp bracket 1, and by so doing, prevents the tilt lock plate 21 from rotating to an undesired angular position even in the loosened state.

When the operating lever 13 is rotated in a direction to tighten the clamping nut 12, the clamping nut 12 is moved axially toward the upper clamp bracket 1 to the right, and the distance bracket 3 is clamped between the left and right side walls of the upper clamp bracket 1 by the clamping bolt 10 and nut 12. In this case, through the wave washer 23 in sliding contact with the operating lever 13 and the tilt lock plate 21, the tilt lock plate 21 is rotated together with the operating lever 13 in the same direction while the tilt lock plate 21 confronts the toothed plate 24 by abutting on the stopper plate 20, until the toothed portion 21a of the tilt lock plate 21 is engaged with the toothed portion 24a of the toothed plate 24.

This engagement between the toothed portions 21a and 24a can firmly prevent the clamping bolt 10 from being lifted upwards even if the driver collides against the steering wheel 7 (shown in FIG. 40) and an excessive impact force exceeding the clamping force of the clamping bolt 10 is applied between the upper clamp bracket 1 and the distance bracket 3, trying to lift the clamping bolt 10 upwards. Thus, this tilt lock mechanism can hold the steering wheel 7 immovable by preventing the distance bracket 3 and the jacket tube 4 from being moved upwards.

In this tilt lock state, the upper clamp bracket 1 and the lock member 21 (or the stopper lever 20) are locked together with the toothed portions 24a and 21a, the clamping bolt 10 holds the lock member 21 (or the stopper lever 20) and the distance bracket 3 immovable by passing therethrough, and the jacket tube 4 is fixed to the distance bracket 3 by welding for example.

Second Embodiment

Figure 5:
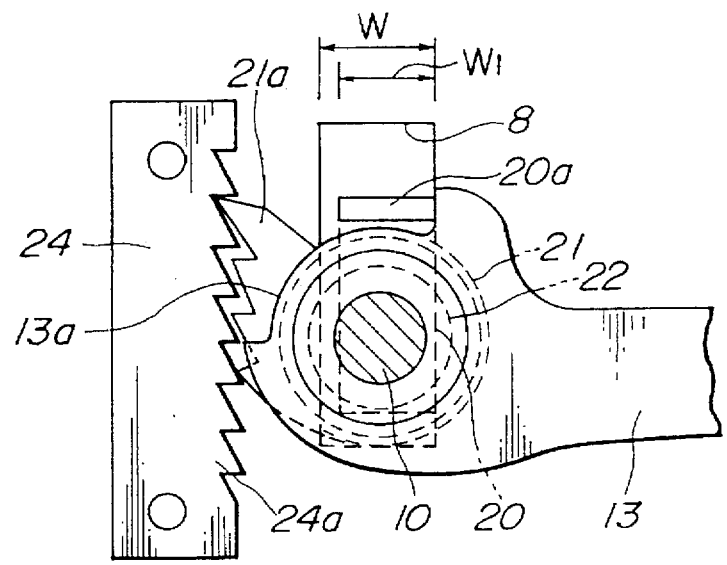
FIG. 5 is a side view of the tilt lock mechanism of FIG. 4.
Figure 6:
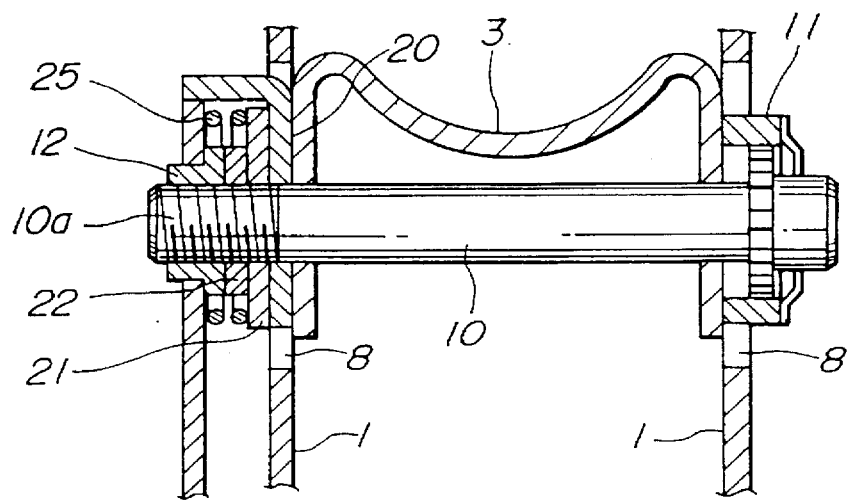
FIG. 6 is a sectional view of the tilt lock mechanism of FIG. 4.
Figure 4:
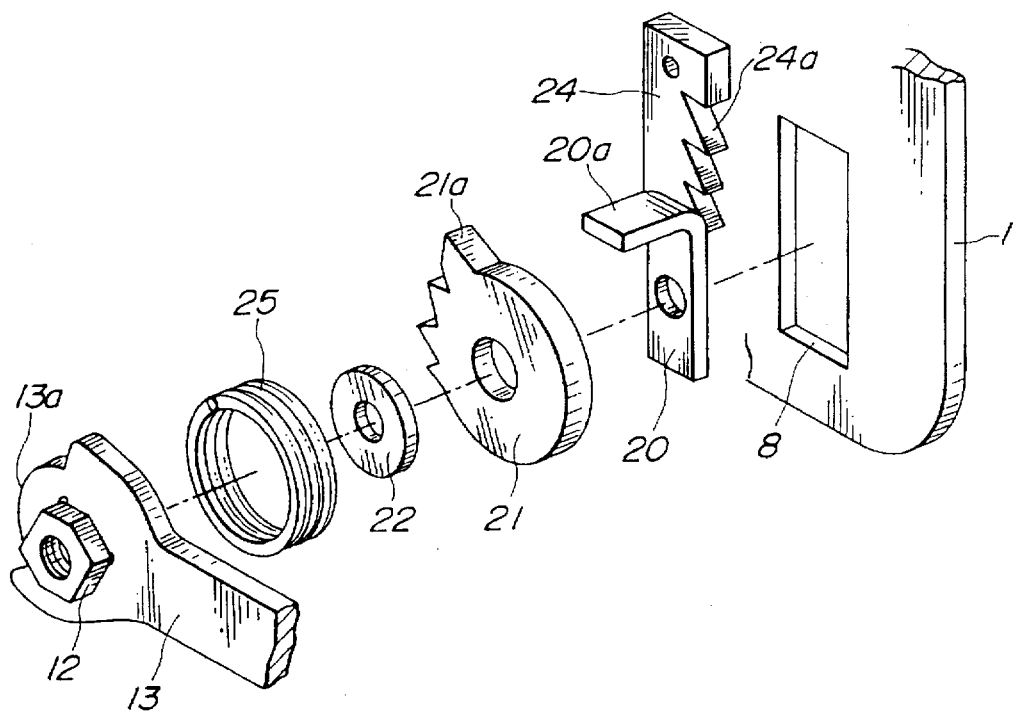
FIG. 4 is an exploded perspective view showing a part of a tilt lock mechanism according to a second embodiment of the present invention.

FIGS. 4~6 show a tilt lock mechanism for a steering column according to a second embodiment of the present invention.

A compression coil spring 25 is employed as the resilient member, as shown in FIGS. 4~6, in place of the wave washer 23. In other respects, the tilt adjustment and locking mechanism shown in FIGS. 4~6 is substantially identical in construction and operation with the mechanism shown in FIGS. 1~3.

Third Embodiment

Figure 7:
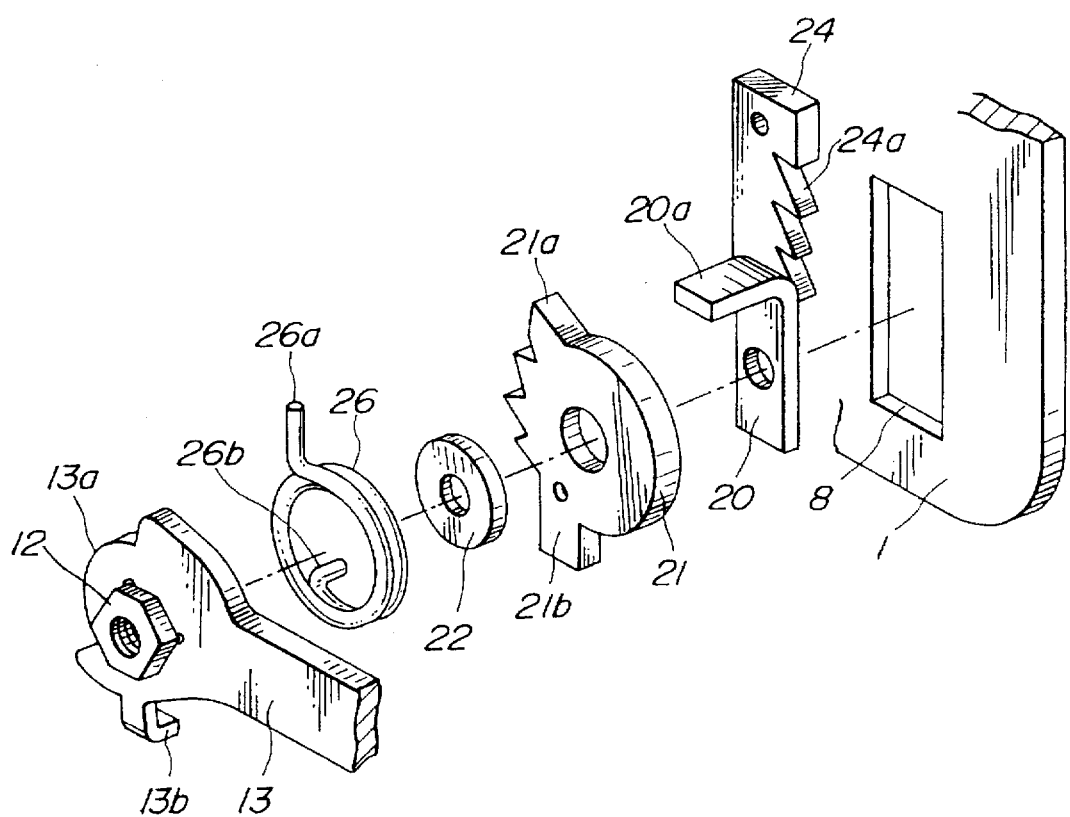
FIG. 7 is an exploded perspective view of a part of a tilt lock mechanism according to a third embodiment of the invention.
Figure 8:
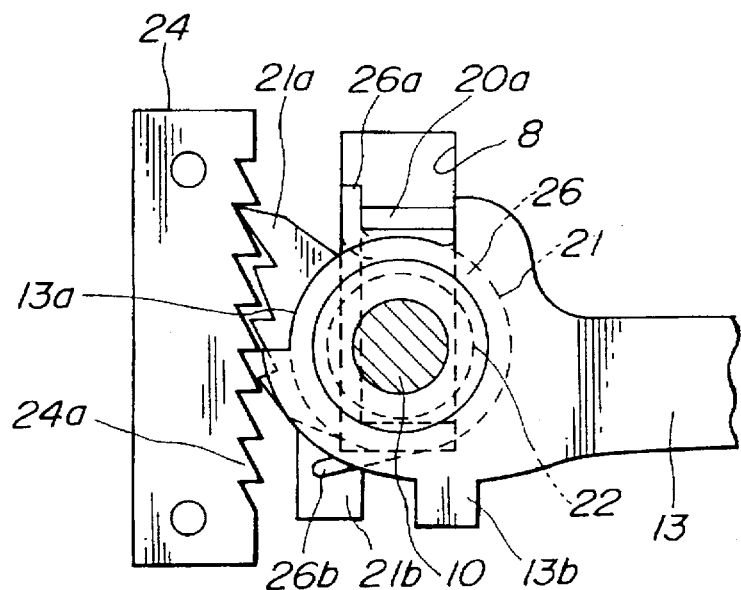
FIG. 8 is a side view showing the tilt lock mechanism of FIG. 7.
Figure 9:
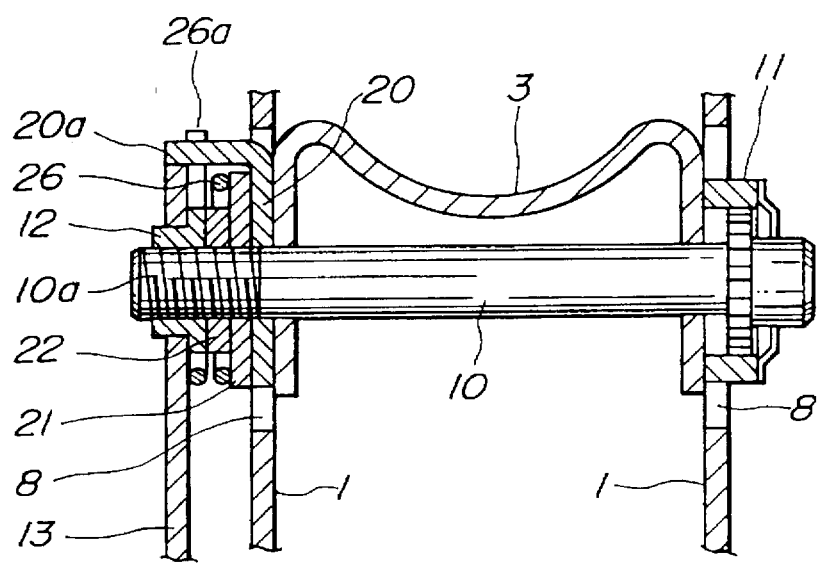
FIG. 9 is a sectional view of the tilt lock mechanism of FIG. 7.

FIGS. 7~9 show a tilt lock mechanism according to a third embodiment of the present invention A torsion spring 26 is employed as the resilient member instead of the wave washer 23. As shown in FIGS. 7~9, the torsion spring 26 has a first spring end 26a engaged with the stopper portion 20a of the stopper lever 20, and a second spring end 26b engaged with the tilt lock plate 21.

The tilt lock plate 21 shown in FIG. 7 is formed with a downward projection 21b. The operating lever 13 shown in FIG. 7 is formed with an L-shaped projection 13b for pushing the projection 21b of the tilt lock plate 21. In the other points, the tilt adjustment and lock mechanism of FIGS. 7~9 is substantially identical to the mechanism according to the first embodiment.

The torsion spring 26 is arranged to urge the tilt lock plate 21 to rotate toward the toothed plate 24 in the locking direction to the lock position in which the toothed portions 21a of the lock plate 21 is engaged with the toothed portion 24a of the toothed plate 24. Therefore, the toothed portions 21a and 24a are normally held engaged by the torsion spring 26, and this engagement can prevent the clamping bolt 10 from being lifted upwards even if the driver collides against the steering wheel and an excessive impact force trying to lift the clamping bolt 10 upwards with a magnitude exceeding the clamping force of the clamping bolt 10 is produced between the upper clamp bracket 1 and the distance bracket 3. Thus, this tilt lock mechanism can hold the steering wheel 7 still by preventing the distance bracket 3 and the jacket tube 4 from being moved upwards.

When the operating lever 13 is pushed down to rotate the clamping nut 12 in a loosening direction and move the nut 12 axially away from the upper clamp bracket 1, the operating lever 13 causes the tilt lock lever 21 to rotate by pushing the downward projection 21b of the lock plate 21 with the L-shaped projection 13b, and by so doing, the operating lever 13 forcibly disengages the toothed portion 21a of the lock plate 21 from the toothed portion 24a of the toothed plate 24.

Thus, this lock mechanism of the third embodiment can unlock the tilt lock more reliably. Moreover, the torsion spring 26 applying a resilient force trying to put the toothed portion 21a of the lock plate 21 in engagement with the toothed portion 24a can ensure the tilt locking operation and hold the toothed portions 21a and 24a more firmly engaged.

Fourth Embodiment

Figure 10:
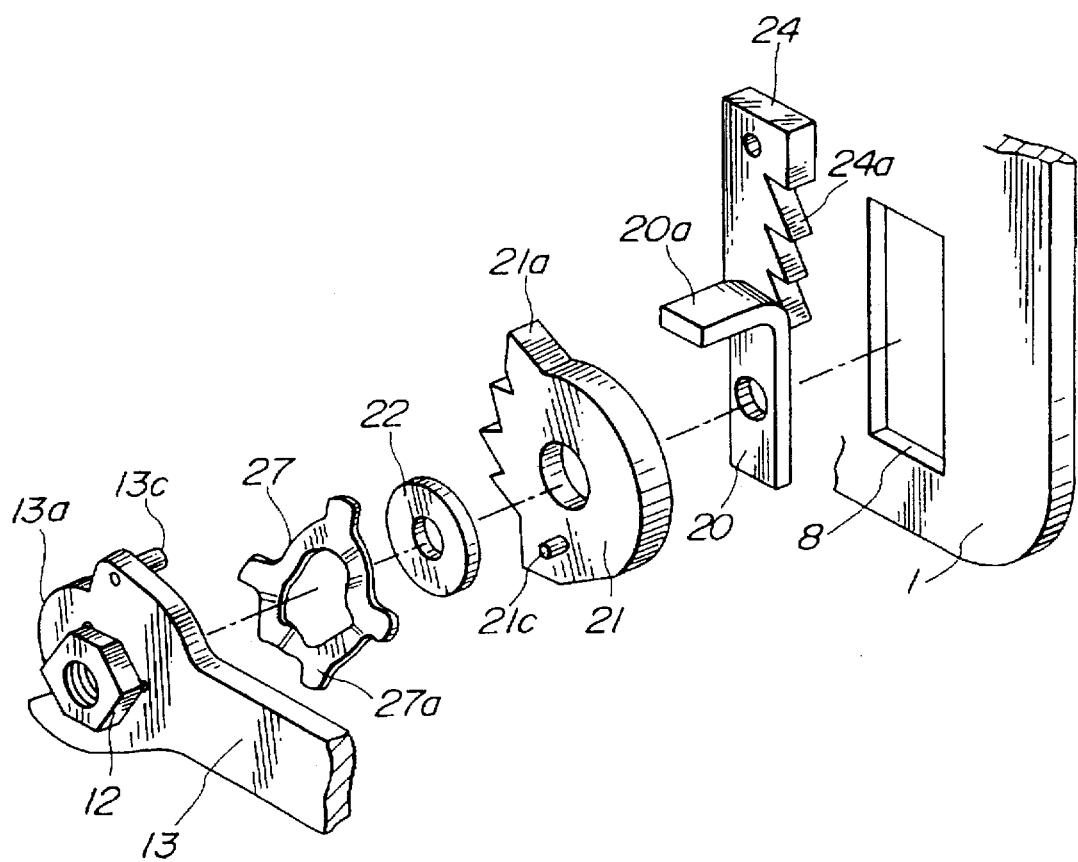
FIG. 10 is a an exploded perspective view of a part of a tilt lock mechanism according to a fourth embodiment of the present invention.
Figure 11:
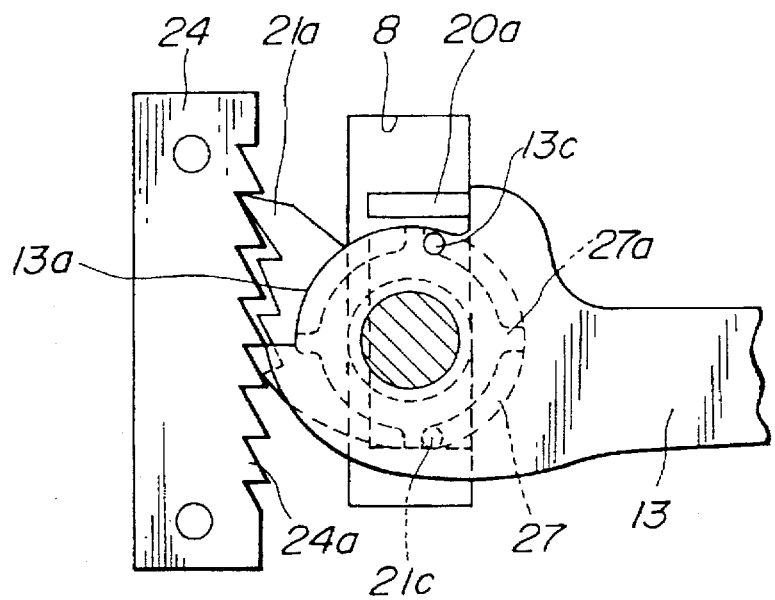
FIG. 11 is a side view of the tilt lock mechanism of FIG. 10.
Figure 12:
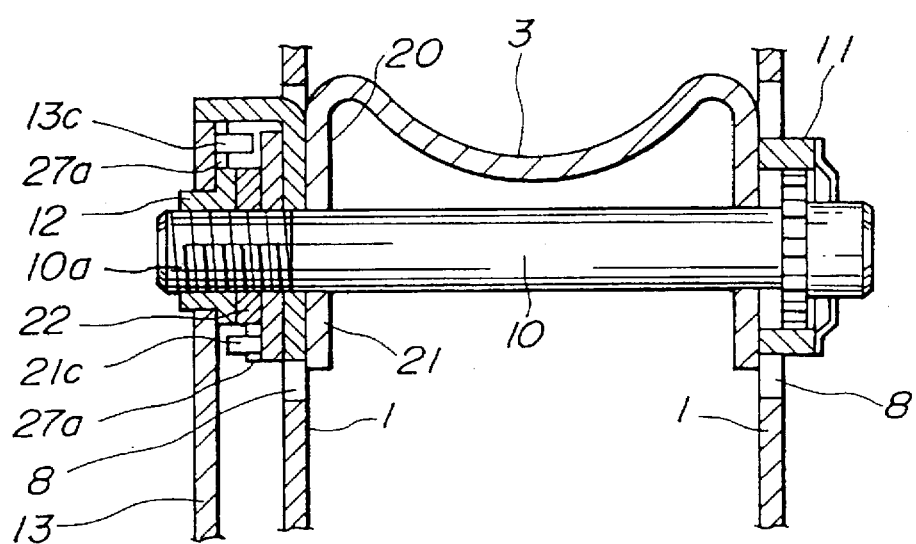
FIG. 12 is a sectional view of the tilt lock mechanism of FIG. 10.

FIGS. 10~12 show a tilt lock mechanism according to a fourth embodiment of the present invention.

The operating lever 13 shown in FIG. 10 is formed with a pin 13c projecting toward the tilt lock plate 21 substantially in parallel to the axis of the clamping bolt 10, and the tilt lock plate 21 is formed with a pin 21c' projecting toward the operating lever 13 substantially in parallel to the clamping bolt 10.

A wave washer 27 (serving as the resilient member) has a plurality of radial outward projections 27a. In this example, there are four of the radial outward projections 27a. The wave washer 27 is mounted on the clamping bolt 10 between the operating lever 13 and the tilt lock plate 21, as shown in FIG. 12. The pins 13c and 21c abut, respectively, on diametrically opposite two of the radial projections 27a of the wave washer 27, as shown in FIG. 11. As shown in FIGS. 11 and 12, the pin 13c is above the clamping bolt 10, and the pin 21c is below. In the other respects, the mechanism shown in FIGS. 10~12 is substantially identical to the mechanism according to the first embodiment.

When the clamping nut 12 is tightened on the clamping bolt 10 by lifting up the operating lever 13, the pin 13c of the operating lever 13 pushes one of the radial projection 27a and causes the wave washer 27 to rotate. With this rotation, the waver washer 27 forces the tilt lock plate 21 in the counterclockwise direction by pushing the pin 21c with another radial projection 27a, and the toothed portion 21a of the tilt lock plate 21 engages with the toothed portion 24a of the toothed plate 24.

This engagement between the toothed portions 21a and 24a can prevent the clamping bolt, 10 from being lifted upwards even if the driver collides against the steering wheel and applies an excessive impact force trying to lift the clamping bolt 10 upwards with a magnitude exceeding the clamping force of the clamping bolt 10. Thus, this tilt lock mechanism can hold the steering wheel 7 firmly by preventing the distance bracket 3 and the jacket tube 4 from being moved upwards.

When the clamping nut 12 is loosened on the clamping bolt 10 by pushing down the operating lever 13, the pin 13c of the operating lever 13 abuts on one projection 27a of the wave washer 27 and rotates the wave washer 27. With this rotation, another projection 27a of the wave washer 27 pushes the pin 21c, and causes the tilt lock plate to rotate in the clockwise direction. In this way, the tilt lock plate 21 is forcibly rotated in the clockwise direction, and its toothed portion 21a is disengaged from the toothed portion 24a.

Fifth Embodiment

Figure 13:
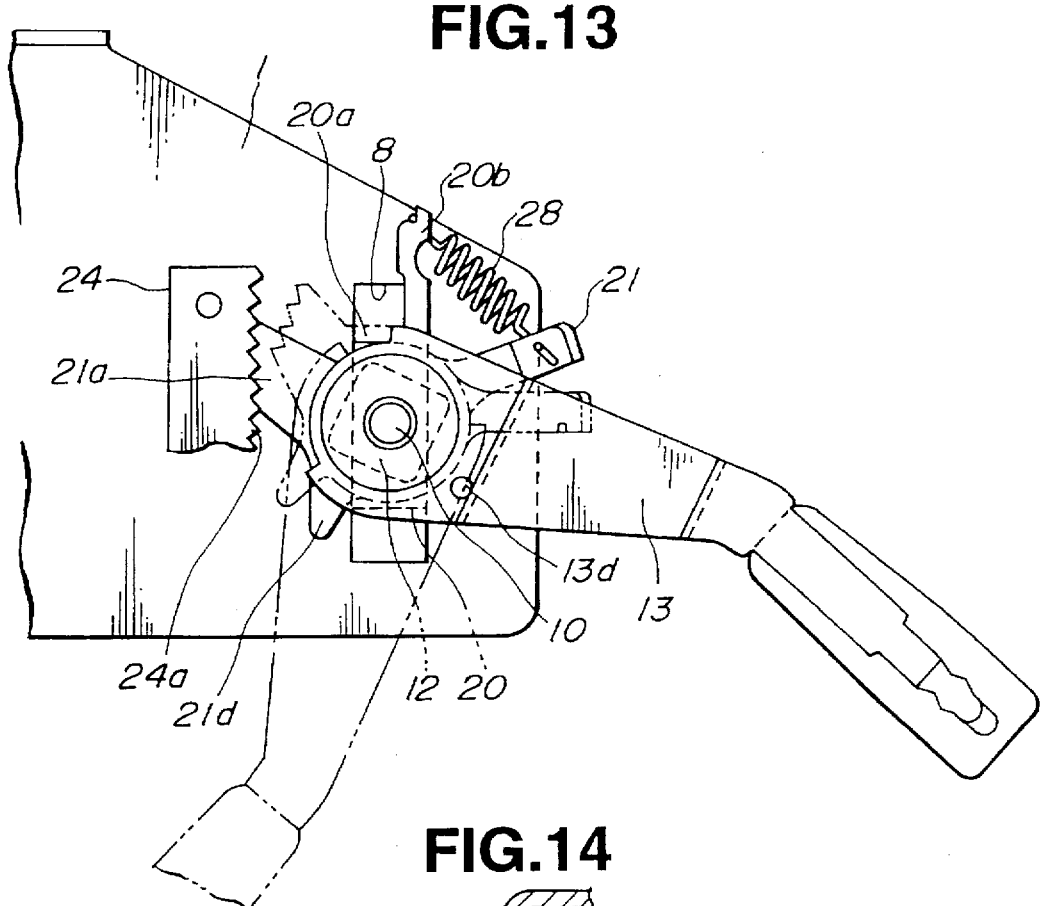
FIG. 13 is a side view showing a tilt lock mechanism according to a fifth embodiment of the present invention.
Figure 14:
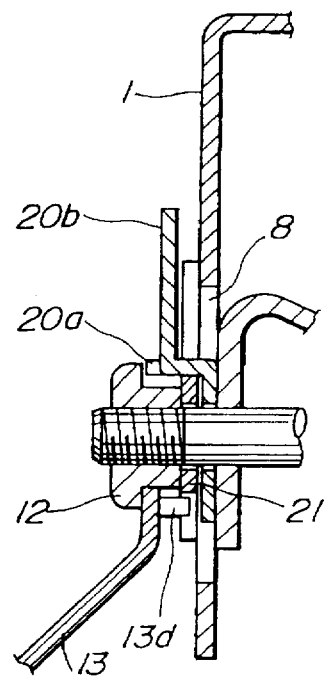
FIG. 14 is a sectional view of the tilt lock mechanism of FIG. 13.

FIGS. 13 and 14 show a tilt lock mechanism for a steering column according to a fifth embodiment of the present invention.

The tilt lock mechanism shown in FIGS. 13 and 14 includes the stopper lever plate 20 which is received in the tilt adjustment elongate hole 8 on one side of the upper clamp bracket 1 in such a manner that the stopper plate 20 is movable up and down in the elongate hole 8, and the tilt lock plate 21 overlapping the stopper plate 20, like the preceding embodiments. The stopper lever 20 and the tilt lock plate 21 are loosely mounted on the clamping bolt 10. The clamping nut 12 is fixed to the operating lever 13, and screwed on the clamping bolt 10.

A resilient member 28 of this example shown in FIGS. 13 and 14 is disposed between the stopper lever plate 20 and the tilt lock plate 21. The stopper lever shown in FIGS. 13 and 14 is integrally formed with an upwardly extending projection 20b for retaining one end of the resilient member 28, and the tilt lock plate 21 has an outward projection for retaining the other end of the resilient member 28. The resilient member 28 applies, on the tilt lock plate 21, a spring force trying to rotate the tilt lock plate 21 in the counterclockwise direction toward the lock position in which the toothed portion 321a is engaged with the toothed portion 24a of the toothed plate 24 fixed to the upper clamp bracket 1 near the elongate hole 8.

The tilt lock plate 21 is formed with a hook portion 21d projecting radially under the toothed portion 21a. The operating lever 13 has a pin 13d projecting toward the upper clamp bracket 1. The pin 13d of the operating lever 13 can abut on the hook portion 21d.

The resilient member 28 urges the tilt lock plate 21 to rotate in the counterclockwise direction and maintains the engagement between the tilt lock plate 21 and the toothed plate 24 of the upper clamp bracket 1. With this engagement, this tilt lock mechanism can securely hold the steering wheel 7 immovable by preventing the distance bracket 3 and the jacket tube 4 from being moved upwards even in case of a collision.

When the operating lever 13 is pushed down to release the clamping of the bolt and nut 10 and 12, the pin 13d of the operating lever 13 abuts on the hook portion 21d and forces the tilt lock plate 21 to rotate in the clockwise direction against the resilient force of the resilient member 28. Thus, the toothed portion 21a is disengaged from the toothed portion 24a while the nut 12 is loosened, and the clamping bolt 10 becomes movable in the tilt adjustment elongate hole 8 together with the stopper lever plate 20. The driver can adjust the position of the steering wheel in the tilt direction.

When the operating lever 13 is returned to the original position after the tilt adjustment of the steering wheel, the pin 13d moves away from the hook portion 21d of the tilt lock plate 21, and accordingly, the tilt lock plate 21 is rotated by the resilient force of the resilient member 28 in the counterclockwise direction to the lock position in which the toothed portions 21a and 24a are in engagement. At the same time, the clamping nut 12 is tightened on the bolt 10, and the distance bracket 3 is clamped between the left and right side walls of the upper clamp bracket 1.

Sixth Embodiment

FIGS. 15-18 show a tilt lock mechanism for a steering column according to a sixth embodiment of the present invention.

Figure 15:
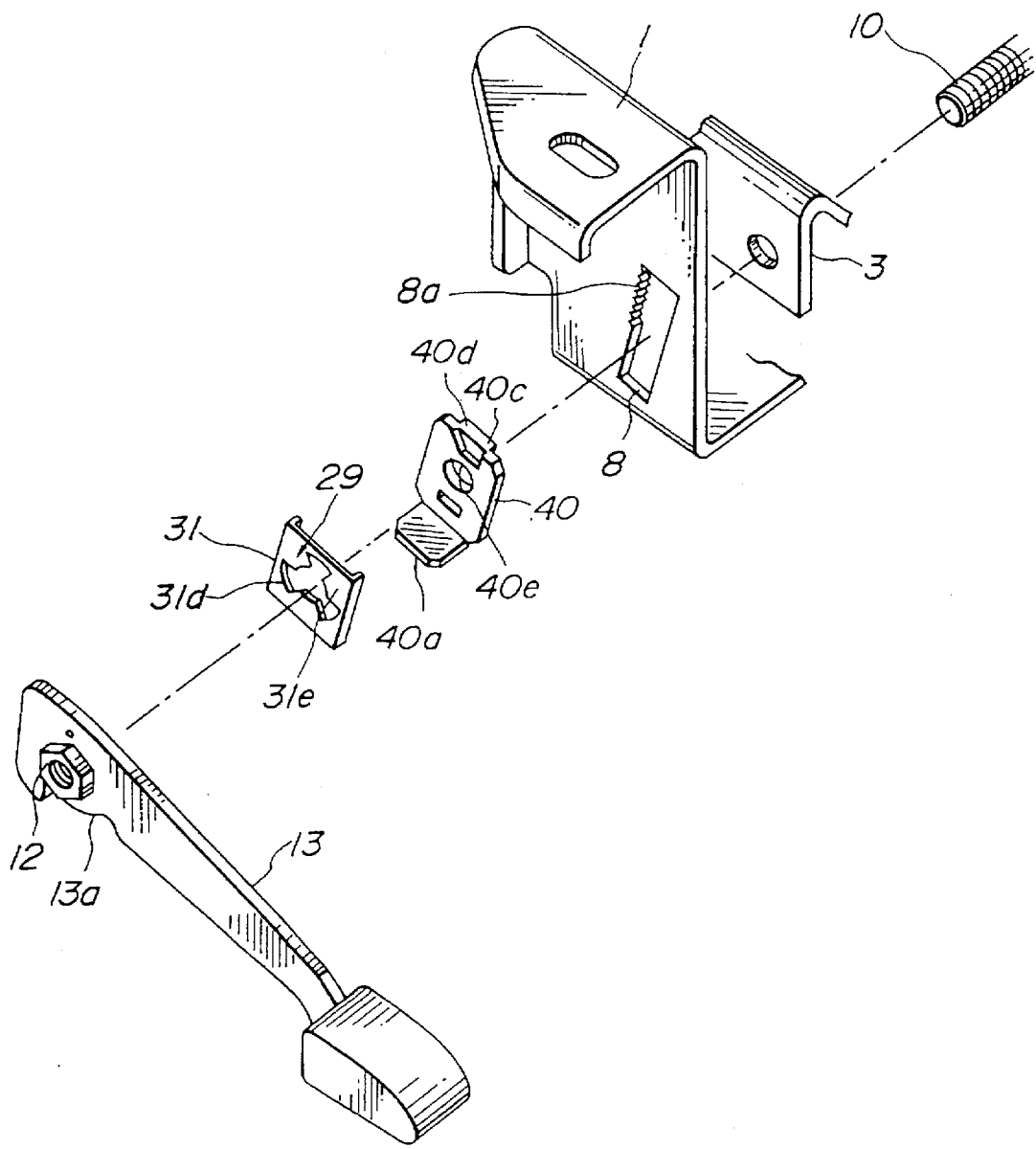
FIG. 15 is an exploded perspective view showing a tilt lock mechanism according to a sixth embodiment of the present invention.

The upper clamp bracket 1 shown in FIG. 15 is formed with a toothed portion 8a in an edge defining the tilt adjustment elongate hole 8 on the first side. In the illustrated example, the elongate hole 8 is rectangular, and bounded by two parallel long sides and two parallel short sides. The toothed portion 8a is formed in one of the long sides of the elongate hole 8, near the upper end of the elongate hole 8.

A stopper lock plate 40 shown in FIG. 15 has a stopper projection 40a, a raised portion 40c which is loosely received in the toothed elongated hole 8, a toothed portion 40d shaped like a claw so as to engage with the toothed portion 8a of the elongate hole 8, and a hole 40e through which the clamping bolt 10 passes. The hole 40 is slightly elongated in the up and down direction.

A cam plate 31 shown in FIG. 15 is loosely mounted on the clamping bolt 10 between the stopper lock plate 40 and the clamping nut 12 fixed to the operating lever 13. The cam plate 31 is in the form of a shaped sheet or plate of spring steel, and has left and right flanges for holding the stopper lock plate 40. A cam hole 29 is formed in the cam plate 31. The cam hole 29 has a central circular hollow portion through which the clamping bolt 10 passes, and a plurality of peripheral hollow portions 31d extending radially outwardly from the central hollow portion. A plurality of fan-shaped tongues 31e project radially inwardly toward the center of the central hollow portion of the cam hole 29. In this example, there are three of the tongues 31e and three of the peripheral hollow portions 31d. The tongues 31e and the peripheral hollow portions 31d are alternately and regularly arranged around the center of the cam hole 29 between two concentric circles. The tongues 31e project toward the operating lever 13.

Figure 16:
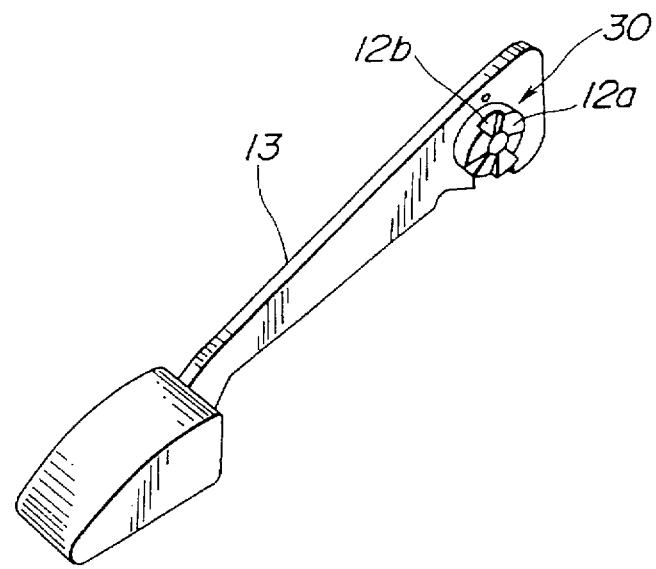
FIG. 16 is a perspective view showing an operating lever 13 of the mechanism of FIG. 15.
Figure 17:
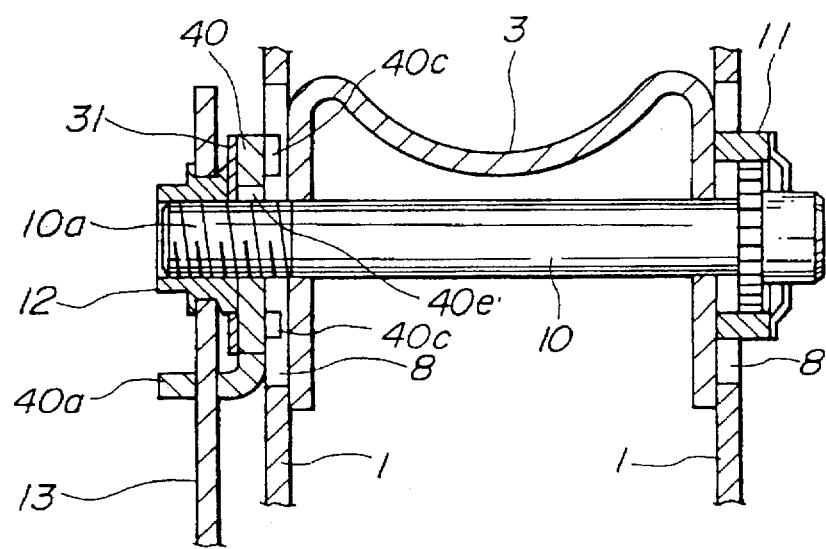
FIG. 17 is a sectional view of the tilt lock mechanism of FIG. 15.
Figure 18:
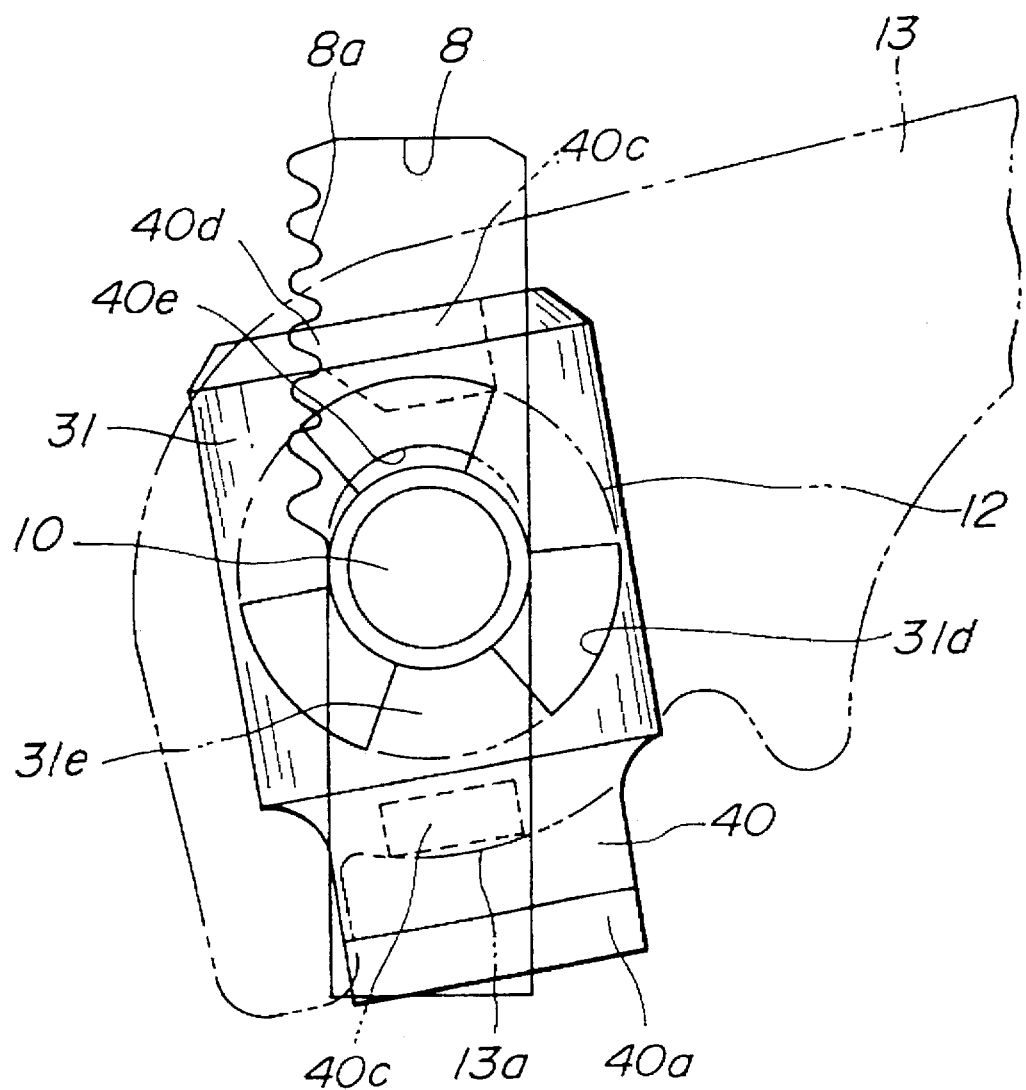
FIG. 18 is a side view for illustrating operations of the tilt lock mechanism of FIG. 15.

The clamping nut 12 of the operating lever 13 is formed with a cam portion 30 projecting toward the cam plate 31. As shown in FIG. 16, the cam portion 30 is composed of fan-shaped projections 12a and recesses 12b. The cam projections 12a are so shaped as to correspond to the tongues 31e of the cam plate 31. There are three of the projections 12a and three of the recesses 12b which are alternately arranged around a threaded hole of the nut 12 between two concentric circles. Each cam projection 12a has an inclined cam surface (taper surface).

When the operating lever 13 is rotated in the tightening direction to clamp the distance bracket 3 with the upper clamp bracket 1, the cam portion 30 of the nut 12 engages in the cam hole 29 of the cam plate 31, and rotates the stopper lock plate 40 with the cam plate 31 in the counterclockwise direction to the lock position in which the toothed portion 40d engages with the toothed portion 8a. In this lock position, the cam projections 12a of the operating lever 13 ride on the tongues 31e of the cam plate. In an unlock state, the cam projections 12a are received in the hollow portions 31d.

This tilt lock mechanism holds the steering wheel stationary with the clamping force of the bolt and nut 10 and 12, and the engagement between the toothed portions 8a and 40d as in the preceding embodiments.

When the operating lever 13 is rotated in the loosening direction, the cam portion 30 received in the cam hole 29 rotates the cam plate 31 in the clockwise direction, and the cam plate 31 in turn rotates the stopper lock plate 40 in the clockwise direction to disengage the toothed portion 40d from the toothed portion 8a. In this unlock state, the stopper lock plate 40 is movable up and down in the toothed elongate hole 8a, and allows a tilt adjustment.

The bolt hole 40e of the stopper lock plate 40 is elongated vertically by a distance corresponding to one tooth of the toothed portion 8a. Therefore, even if the toothed portion 40d is not in the correct position to engage with the toothed portion 8a when the nut 12 is tightened on the bolt 10, the stopper lock plate 40 moves slightly in the bolt hole 40e, so that the toothed portion 40e can correctly engage with the toothed portion 8a.

Seventh Embodiment

FIGS. 19-27 show a steering column assembly according to a seventh embodiment of the present invention. This steering column assembly is of a telescopic and tilting type.

An upper mounting clamp bracket 215 shown in FIGS. 19-27 is fixed to a vehicle body when assembled in a vehicle. This clamp bracket 215 has left and right (first and second side) upright walls (or arms), a lower portion connecting the lower ends of the left and right walls, and flanges projecting from the upper ends of the left and right walls. A tilt adjustment elongate hole 216 is formed in each of the left and right side walls. The elongate holes 216 are elongated in an approximately vertical direction to allow the tilting movement of the steering wheel.

A movable column support bracket (or jacket mounting bracket) 225 has left and right (rear) arms 230 extending between the left and right side walls of the upper clamp bracket 215. Each arm 230 of the column support bracket 225 is formed with a telescopic adjustment elongate hole 231.

A clamping bolt 219 passes through the tilt adjustment elongate holes 216 of the upper clamp bracket 215, and the telescopic adjustment elongate holes 231 of the column support bracket 225.

A jacket holder 222 is disposed between the left and right arms 231 of the column support bracket 225 and between the left and right upright side walls of the upper clamp bracket 215. The clamping bolt 219 passes through holes of the jacket holder 222. The jacket holder 22 has an approximately oval opening 221 receiving a middle section 220a of a jacket tube 220. The middle section 220a of the jacket tube 220 has an approximately oval cross sectional shape fitting in the opening 221 of the jacket holder 222. The jacket holder 222 has a slit axially extending and opening to the opening 221, and is designed to compress the jacket tube 220. The jacket holder 222 has left and right upper flanges 224 which project slightly and which are received, respectively, in left and right cutout portions 223 formed in the left and right side walls of the upper clamp bracket 215. Each cutout portion 223 is open upwards, and the flanges 224 of the jacket holder 222 are movable up and down.

Figure 20:
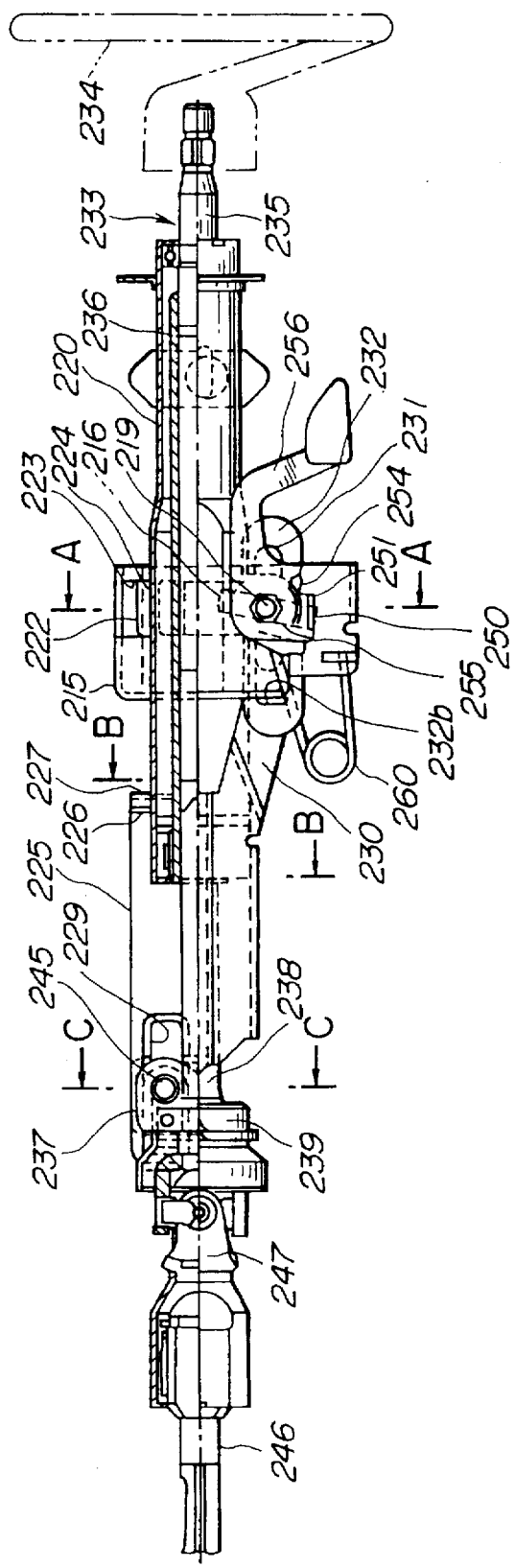
FIG. 20 is a side view partly in section, showing a steering column assembly with the tilt lock mechanism of FIG. 19.
Figure 21:
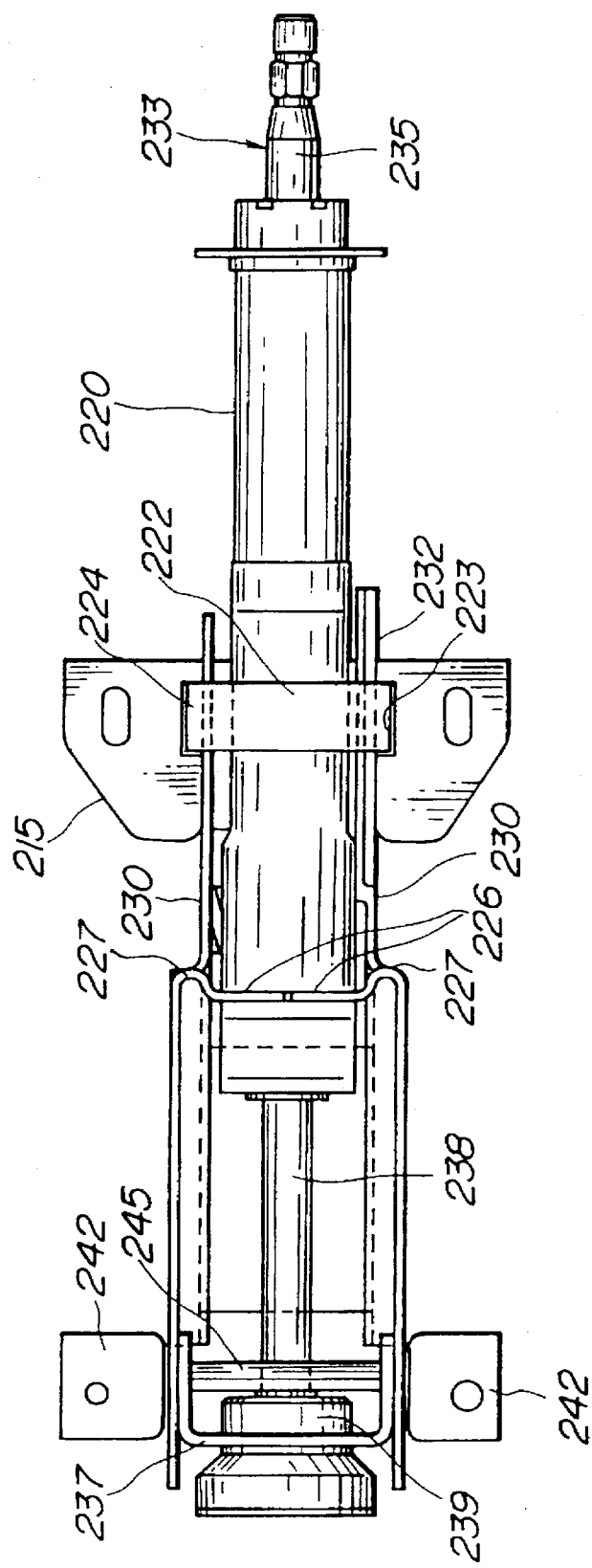
FIG. 21 is a plan view of a part of the steering column assembly of FIG. 20.
Figure 22:
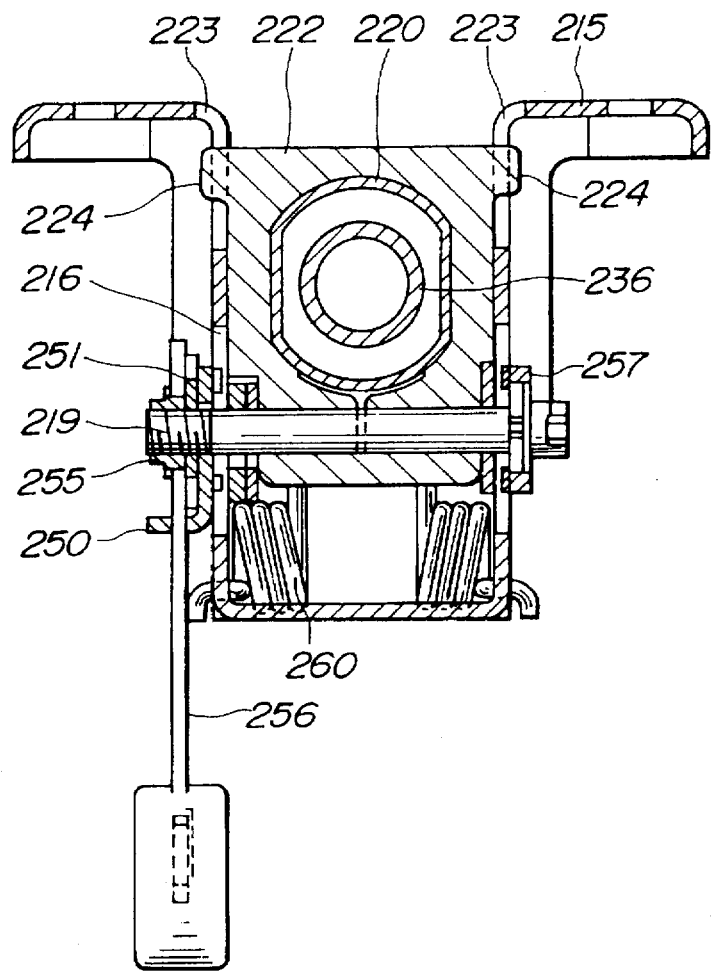
FIG. 22 is a sectional view taken across a line A—A in FIG. 20.
Figure 23:
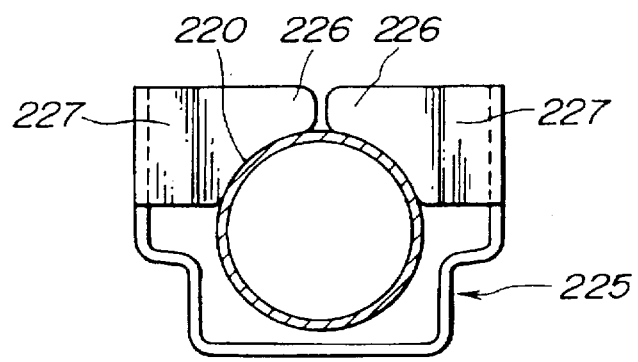
FIG. 23 is a sectional view taken across a line B—B in FIG. 20.
Figure 24:
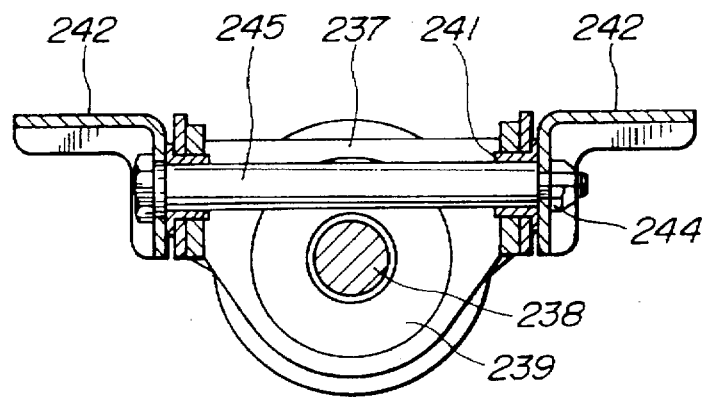
FIG. 24 is a sectional view taken across a line C—C in FIG. 20.
Figure 25:
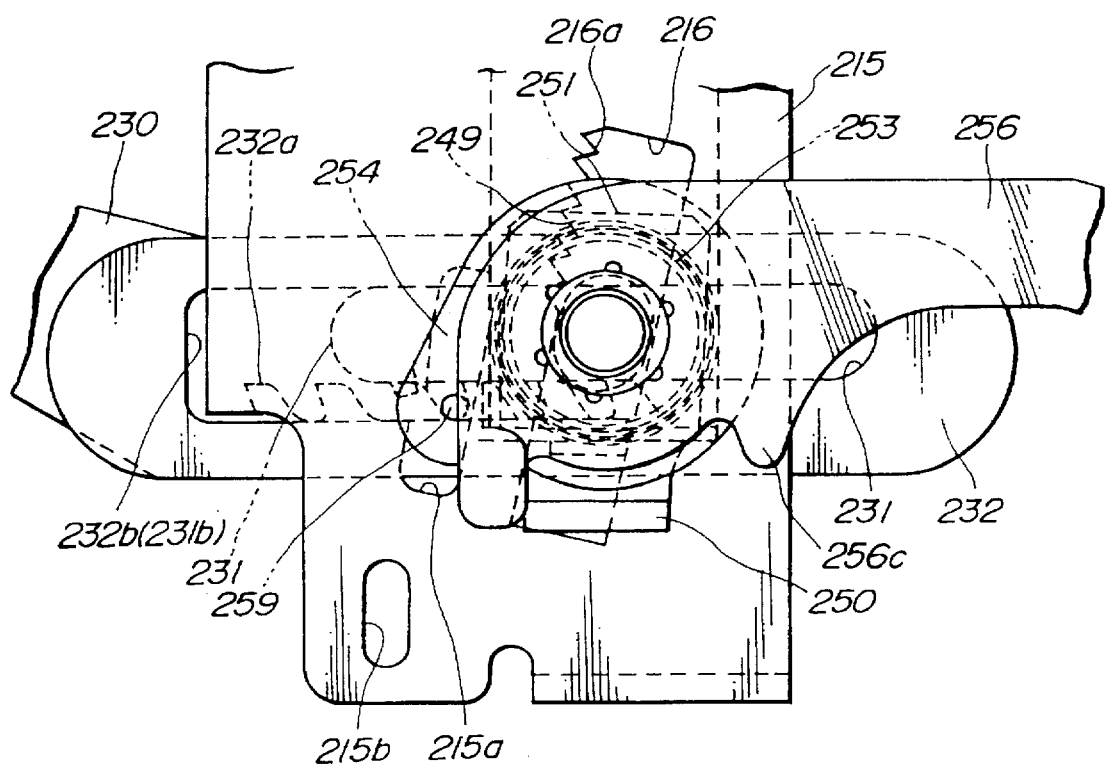
FIG. 25 is an enlarged view of a portion of FIG. 20.
Figure 26:
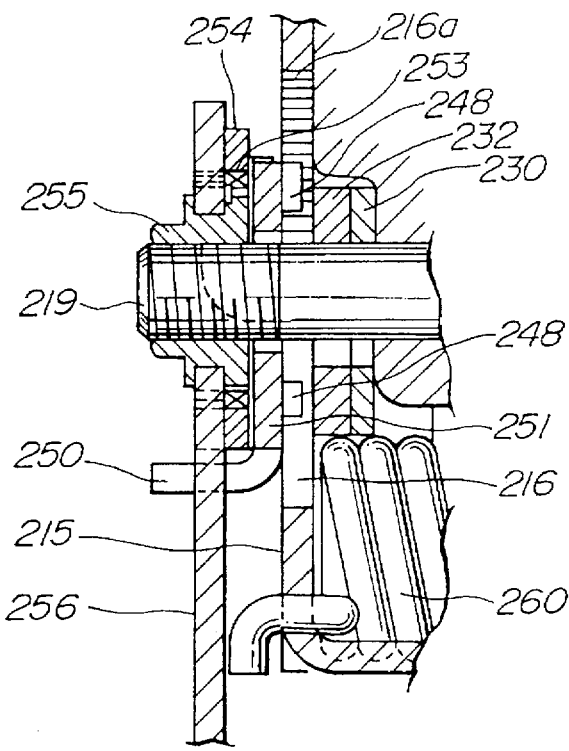
FIG. 26 is an enlarged view of a portion of FIG. 22.

The jacket tube 220 is fixed to the column support bracket 225. The column support bracket 225 has an U-shaped portion having left and right upright walls and a bottom connecting between the lower ends of the left and right upright walls. The column support bracket 225 further includes left and right fixing portions 226 extending toward each other, respectively, from the rear ends of the left and right upright walls; left and right bent (curved) portions 227 which can be deformed plastically when the fixing portions 226 are pushed toward the front of the vehicle; and left and right cuts 228 designed to facilitate the plastic deformation of the bent portions 227. The left and right portions 226, 227 and 228 are arranged in a manner of bilateral symmetry. The jacket tube 220 is welded to the fixing portions 226 of the column support bracket 225. The column support bracket 225 further has left and right front arms projecting from the left and right upright walls. Each of the front arms is formed with a front telescopic slot 229. The arms 230 projects rearward toward the steering wheel from the U-shaped portion of the bracket 225. In this example, as shown in FIG. 20, the rear telescopic adjustment elongate holes 231 are below the axis of the steering column, and the front telescopic slots 229 are above.

A steering shaft 233 is received in the jacket tube 220. The steering shaft 233 is axially contractible in the jacket tube 220. The steering shaft 233 is constituted of an upper shaft 235 extending from a steering wheel 234 as shown in FIG. 20, a lower shaft 238, and a tube 236 coupling the upper and lower shafts 235 and 238. The tube 236 is welded to the upper shaft 235, and the lower shaft 238 has an externally serrated shaft end engaged in an internally serrated hole of the tube 236. A bearing 239 shown in FIGS. 19, 20 and 21 rotatably supports the lower end of the lower shaft 238.

Figure 19:
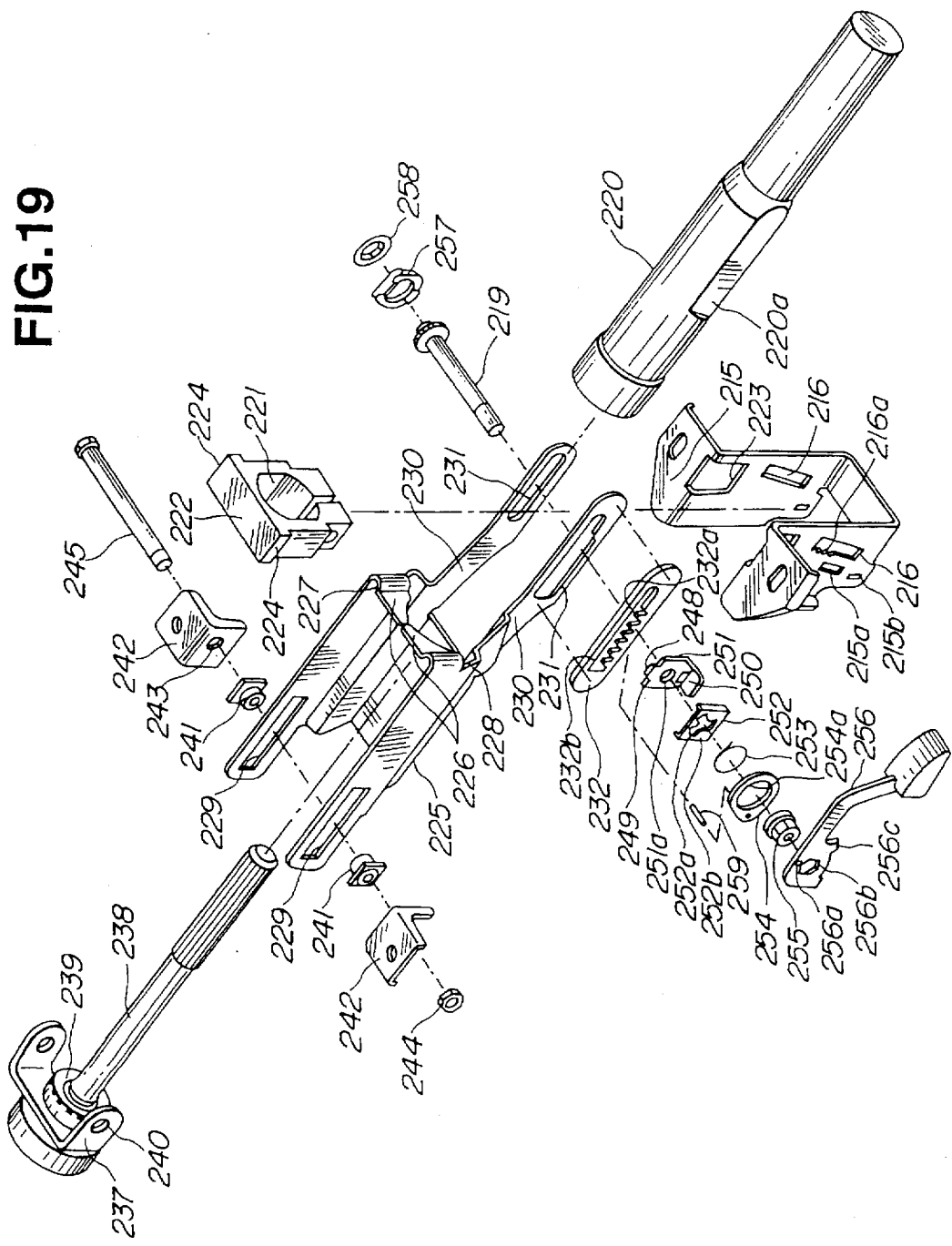
FIG. 19 is an exploded perspective view showing a tilt and telescopic lock mechanism according to a seventh embodiment of the present invention.

The steering shaft 233 is swingable up and down on a tilt hinge bolt 245. A lower bracket 237 supporting the bearing 239 of the lower steering shaft 238 has left and right flanges formed, respectively, with left and right circular bolt holes 240 as shown in FIG. 19. Each of left and right lower mounting brackets 242 is designed to be fixed to the vehicle body, and formed with a circular bolt hole 243. The tilt hinge bolt 245 passes through the holes 240 of the lower bracket 237, left and right collars 241 which are received in the front telescopic slots 229, and the holes 243 of the left and right lower mounting brackets 242. The tilt hinge bolt 245 has a head at the right end, and a threaded left end screwed into a nut 244. The lower end of the steering shaft 233 is connected with an intermediate shaft 246 through a universal joint 247, as shown in FIG. 20.

A telescopic lock toothed portion 232a is formed, as best shown in FIG. 19, in a telescopic lock toothed member 232 which is fixed, by welding for example, to the outside surface of the left (first) side arm 230 of the column support bracket 225. The elongate hole 231 of the left arm 230 is stepped and slightly longer than the elongate hole 231 of the right arm 230. The toothed member 232 has an elongate hole 232b approximately identical in shape to the left side stepped elongate hole 231. The elongate hole 232b is bounded by a straight upper edge, and a lower edge consisting of a short section and a lowered long section in which the toothed portion 232a is formed. The toothed portion 232a is slightly lower than the lower edge defining the elongate hole 231 of the right side arm 230. The clamping bolt 219 passes through the elongate holes 231 of the left and right arms 230 and the toothed elongate hole 232a of the toothed member 232. The clamping bolt 219 can slide in the elongate holes 231 without being interfered with by the toothed portion 232a. It is possible to form the toothed portion 232a directly in the edge of the elongate hole 231 of the left arm 230.

A tilt lock toothed portion 216a is formed in the edge of the tilt adjustment elongate hole 216 of the left (first side) wall of the upper mounting bracket 215 as the toothed portion 8a shown in FIG. 15.

A tilt lock plate 251 and a cam plate 252 are similar to the tilt lock plate 40 and the cam plate 31 shown in FIG. 15. The tilt lock plate 251 is loosely received in the left side toothed elongate hole 216, and has a raised portion 248 which is loosely received in the left side toothed elongate hole 216, a toothed portion 249 shaped like a claw so as to engage with the toothed portion 216a of the toothed elongate hole 8, a stopper projection 250 for limiting the rotation of an operating lever 256, and a bolt hole 251a receiving the clamping bolt 219. The bolt hole 251a is slightly elongated in the up and down direction like the hole 40e shown in FIG. 15.

The cam plate 252 is loosely mounted on the clamping bolt 219 between the tilt lock plate 251 and a clamping nut 255 which is screwed on the left (first side) end of the clamping bolt 219 and engaged in a hexagonal hole 256b of the operating lever 256. The cam plate 252 has left and right flanges for holding the tilt lock plate 251, a cam hole 252a, and three fan-shaped tongues 252b projecting radially inwardly toward the center of the cam hole 252a. The tongues 252a are arranged in a manner of radial symmetry around the center of the cam hole 252a between two concentric circles. The clamping bolt 219 extends through the central portion of the cam hole 252a.

Figure 27A:
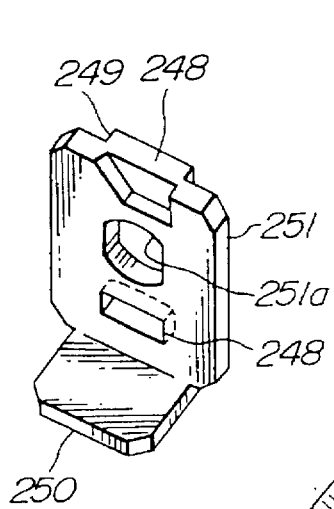
FIGS. 27A and 27B are perspective views showing a stopper lock plate 251 and an operating lever 256 of the tilt lock mechanism of FIG. 19.
Figure 27B:
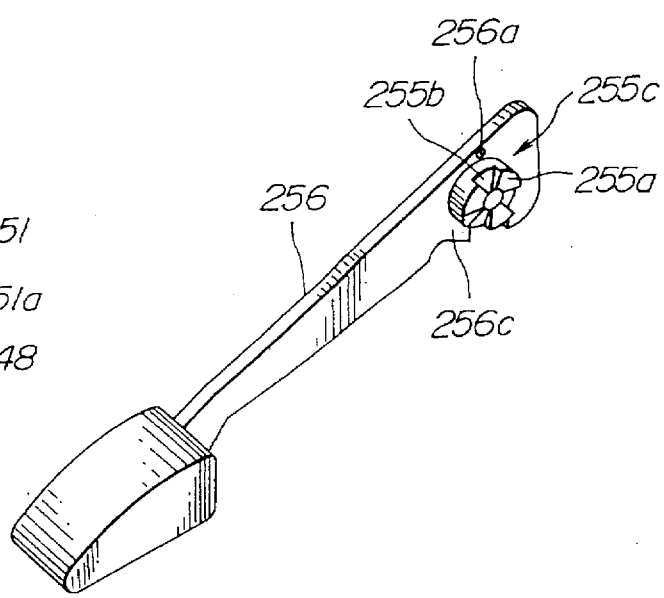

The clamping nut 255 of the operating lever 219 is formed with a cam portion 255c composed of fan-shaped cam projections 255a corresponding to the tongues 252b, and cam recesses 255b, as shown in FIG. 27B.

A telescopic lock pin holder 254 shaped like a ring, and a coil spring (resilient member) 253 are loosely mounted on the clamping bolt 219. The coil spring 253 is disposed between the pin holder 254 and the operating lever 256. The spring 253 has a first spring end engaged with an engaging portion 254a of the pin holder 254, and a second spring end engaged in a small hole 256a of the operating lever 256. A telescopic lock pin 259 projects from the pin holder 254 along the axial direction of the clamping bolt 219 toward the right (second) side. The lock pin 259 extends through a slot 215a formed in the left (first) side wall of the upper mounting bracket 215, into the elongate hole 232b of the telescopic lock toothed plate 232 fixed to the arm 230 of the column support bracket 225. The lock pin 259 can engage with, and disengage from, the toothed portion 232a of the toothed plate 232.

The right (second) end of the clamping bolt 219 is capped with a rotation preventing stopper member 257 by using a push nut 258. Left and right ends of a tilt balance spring 260 in the form of a double coil spring are engaged in holes 215b in the left and right side walls of the upper mounting bracket 215, and a middle portion engaged with the jacket holder 222.

The telescopic and tilt adjustment mechanism shown in FIGS. 19~27B is operated as follows:

When the operating lever 256 is in a release position, the cam projections 255a of the nut 255 are received in the cam hole 252a of the cam plate 252, and the tilt lock plate 251 is held by the left and right flanges of the cam plate 252. The telescopic lock pin holder 254 is rotated in the counterclockwise direction by the operating lever 256 through the spring 253, and held in the unlock position in which the telescopic lock pin 259 is disengaged above the toothed portion 232a.

In this unlock state, the driver can adjust the position of the steering wheel 234 in the telescopic direction within the range allowed by the telescopic adjustment elongate holes 231 and 232b by moving the steering wheel back and forth, and in the tilting direction within the range of the tilt adjustment elongate holes 216 by moving the steering wheel up and down.

When the operating lever 256 is rotated in the tightening direction (the counterclockwise direction), the nut 255 of the operating lever 256 rotates the cam plate 252 with the cam projection 255a fit in the cam hole 252a of the cam plate 252, and the cam plate 252 in turn rotates the tilt lock plate 251 in the counterclockwise direction until the toothed portion 249 of the tilt lock plate 251 engages with the toothed portion 216a of the upper bracket 215. In this case, because of the vertically elongated bolt hole 51a of the tilt lock plate 251, and the cam plate 252 so shaped as to allow an up and down movement of the tilt lock plate 251, the tilt lock plate 251 can move up and down slightly, and cause the toothed portion 249 to slide in a groove of the toothed portion 216a even if the toothed portion 249 first abuts on the top of a tooth in the toothed portion 216a.

The telescopic lock pin holder 254 is rotated through the lock spring 253 by the operating lever 256 in the same lock (counterclockwise) direction, and pushes the lock pin 259 down to the toothed portion 232a of the toothed plate 232 fixed to the column support bracket 225. The lock pin 259, therefore, enters one groove of the toothed portion 232a, or abuts on the top of one tooth of the toothed portion 232a, being pressed by the spring 253.

When the operating lever 256 is further rotated in the tightening (lock) direction, the cam projections 255a of the nut 255 move onto the tongues 252b of the cam plate 252, and thereby produces a great axial force along the clamping bolt 219. Therefore, the jacket holder 222 and the left and right arms 230 of the support bracket 225 are clamped and fixed between the left and right side walls of the upper mounting bracket 215 with the axial force. In this way, this mechanism can attain a tilt friction lock. The jacket holder 222 compresses the middle section 220a of the jacket tube 220 with the axial clamping force of the bolt 219, and the arms 230 of the support bracket are also clamped to provide a telescopic friction lock.

With the axial clamping force, the tilt lock plate 251 and the cam plate 252 are gripped tightly and fixed in the engaged state of engagement with the upper bracket 215. Because the operating lever 256 is rotated until the stopper projection 250 of the tilt lock plate 251 abuts against the operating lever 256, the coil spring 253 is flexed, and accordingly increases the resilient force pressing the telescopic lock pin 259 against the toothed portion 232a.

When the operating lever 256 is rotated in the loosening unlock (clockwise) direction, the tilt lock and the telescopic lock are canceled. In order to ensure the unlock operation, the operating lever 256 pushes the stopper projection 50 of the tilt lock plate 251 with a projection 256c of the operating lever 256 shown in FIGS. 19, 25 and 27B, and forces the tilt lock lever 251 to rotate to the unlock position. On the other hand, the rotation of the operating lever 256 in the unlock direction tries to cause the spring 253 to expand so as to increase the diameter of the spring 253. However, the spring 253 is confined in the hole of the pin holder 254. Therefore, the spring 253 is unable to expand, and instead causes the pin holder 254 to rotate in the unlock direction.

In case of a collision of the vehicle, the driver collides against the steering wheel 234, and applies an impact force on the steering column. This force tries to shift the steering shaft 233 and the jacket tube 220 axially, and to move the support bracket 225 toward the front of the vehicle. This movement is prevented, however, by the telescopic lock pin 259 which is in engagement with the toothed portion 232a, or which slightly move into engagement with the toothed portion 232a.

Moreover, the clamping bolt 219 is prevented from being moved upward by the upward component of the impact force, not only by the clamping force of the bolt 219 but the locking engagement between the toothed portion 249 of the tilt lock plate 251 and the toothed portion 216a of the toothed elongate hole 216.

The jacket tube 220 pushes the fixing portions 226 of the support bracket 225 toward the front of the vehicle, and the support bracket 225 is locked by the engagement between the lock pin 259 and the toothed portion 232a. Accordingly, the impact energy is absorbed by plastic deformation of the bent portions 227, and breakage of the side walls along the cut portions 228. Thus, the support bracket 225 protects the driver by absorbing the impact load of the driver.

As explained above, the tilt lock pin holder 254 is rotated to the lock position automatically with the clamping operation of the operating lever 256, and this lock mechanism improves the impact energy absorbing performance by minimizing the time and distance that the steering wheel moves forward without absorption of the impact energy. Furthermore, the telescopic locking operation and the tilt locking operation are performed simultaneously with the operating lever 256.

Eighth Embodiment

Figure 28:
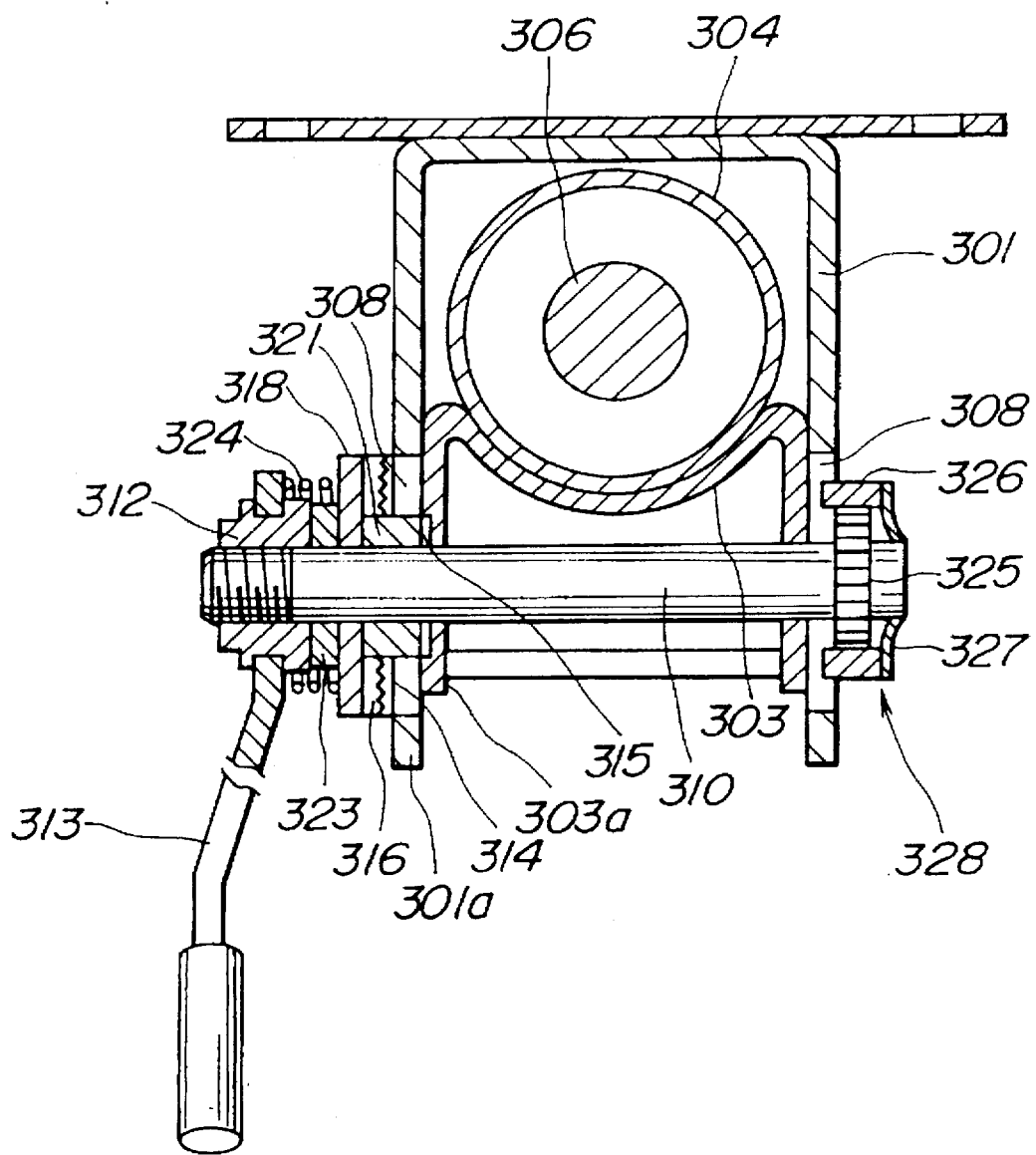
FIG. 28 is a sectional front view showing a tilt and telescopic lock mechanism according to an eighth embodiment of the present invention.
Figure 29:
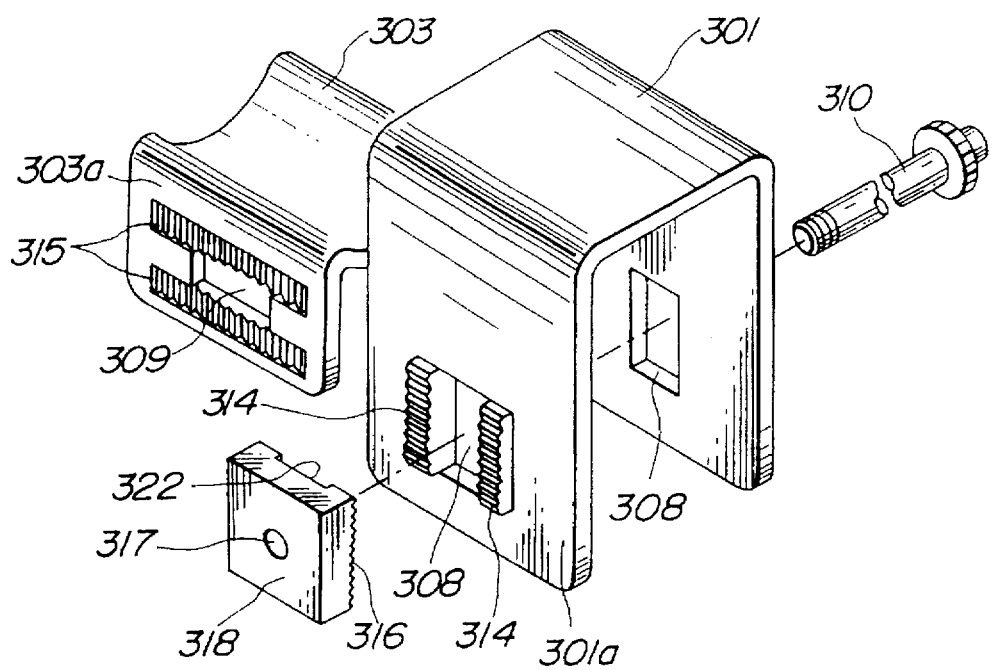
FIG. 29 is an exploded perspective view showing main component parts of the lock mechanism shown in FIG. 28.
Figure 30:
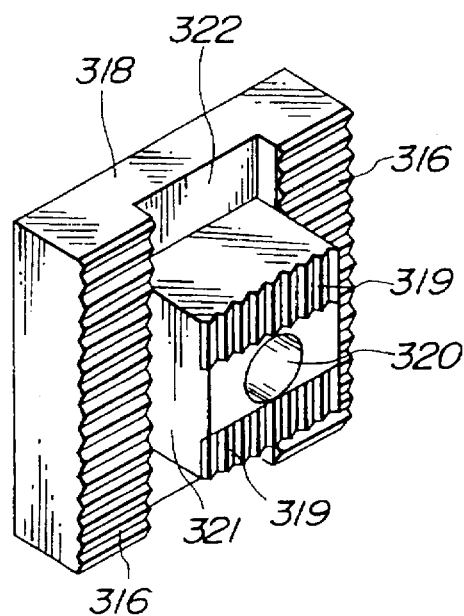
FIG. 30 is a perspective view showing a lock member of the lock mechanism of FIG. 28.

FIGS. 28–30 show a steering column assembly according to an eighth embodiment of the present invention.

Figure 40:
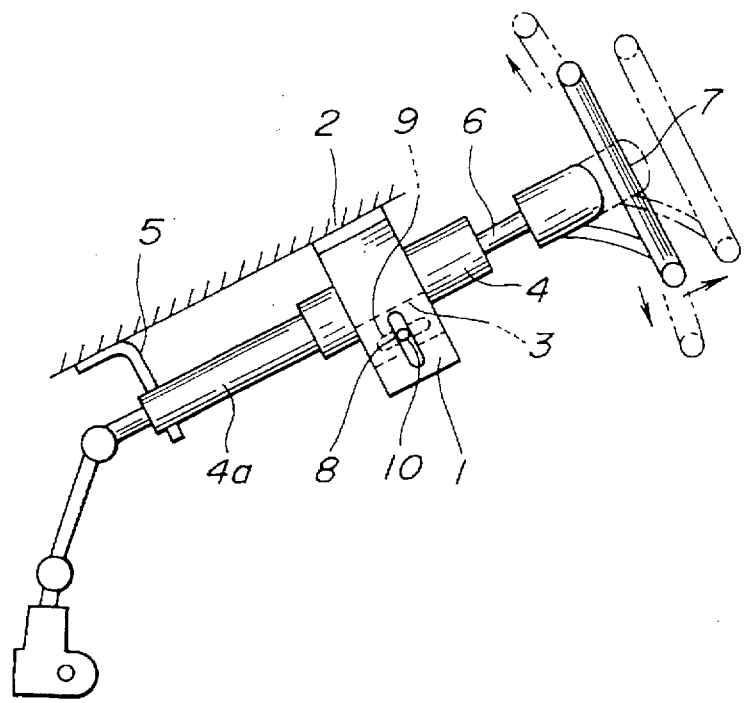
FIG. 40 is a side view showing a conventional tilting and telescopic steering column assembly.
Figure 41:
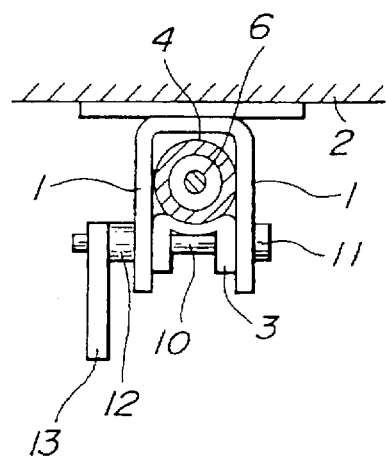
FIG. 41 is a sectional view showing a lock mechanism of the conventional steering column assembly of FIG. 40.

As in the conventional structure shown in FIGS. 30 and 40, an upper mounting clamp bracket 301 shown in FIG. 28 is fixed to the vehicle body, and a distance bracket (or column support bracket) 303 is movable up and down between first and second side walls (or arms) of the upper clamp bracket 301. The distance bracket 303 has a portion to which a jacket tube 304 is fixed. A lower tube (4a) is axially slidably received in the jacket tube 304, and fixed at a lower end portion to the vehicle body through a lower mounting clamp bracket (5) having a flexibility. A steering shaft 306 capable of expansion and contraction in the axial dimension is rotatably received in the jacket tube 304, and a steering wheel (7) is mounted on the upper end of the steering shaft 306.

The upper clamp bracket 301 of this example is a U-shaped member having an upper flat portion and left and right vertical side walls extending downwards from the left and right sides of the upper flat portion, as best shown in FIG. 29. The distance bracket 303 has a concave upper portion on which the jacket tube 304 is fixedly mounted, and left and right side walls extending downwards from the left and right sides of the upper portion.

A tilt adjustment elongate hole 308 is formed in each of the first and second (left and right) side walls (arms) of the upper clamp bracket 301. A telescopic adjustment elongate hole 309 is formed in each of the first and second (left and right) side walls (or arms) of the distance bracket 303. The tilt adjustment elongate hole 308 of the first (left) side wall 301a is fringed with front and rear tilt lock toothed portions 314 projecting from the outside surface of the left side wall of the upper clamp bracket 301. The telescopic lock elongate hole 309 of the first (left) side wall 303a is fringed with upper and lower telescopic lock toothed portions 315 which are depressed under the outside surface of the left side wall of the distance bracket 303. The tilt lock toothed portions 314 has teeth (or sawteeth) which extend perpendicular to the elongate direction of the tilt adjustment elongate hole 308 and which are spaced regularly, like a rack, along a straight line parallel to the elongate direction along which the tilt adjustment elongate hole 308 is elongated. The telescopic lock toothed portions 315 has teeth (or sawteeth) which extend perpendicular to the elongate direction of the telescopic adjustment elongate hole 309 and which are spaced regularly, like a rack, along a straight line parallel to the elongate direction along which the telescopic adjustment elongate hole 309 is elongated. The telescopic lock toothed portions 315 are depressed below the flat outside surface of the left side wall of the distance bracket 303, and the flat outside surface of the left side wall 303a of the distance bracket 303 can slide smoothly on the flat inside surface of the left side wall 301a of the upper clamp bracket 301. It is possible to employ an uneven or rough or serrated surface instead of teeth.

As shown in FIGS. 29 and 30, a first movable lock member 318 has a central bolt hole 317 and left and right (or front and rear) tilt locking toothed portions 316 which can engage with the tilt lock toothed portions 314 of the upper clamp bracket 301. The bolt hole 317 is located between the left and right toothed portions 316. A second movable lock member 320 has upper and lower telescopic locking toothed portions 319 which are formed on the upper and lower sides of a central bolt hole 320. The first movable lock member 318 has a groove 322 extending vertically between the left and right toothed portions 316, and the second movable lock member 321 is fit in the groove 322 of the first movable lock member 318. In this example, the height of the second movable member 321 is smaller than the height of the first movable member 318, and the second movable member 321 is located between an upper end section of the groove 322 extending upwards from the second member 321 and opening upwards, and a lower end section of the groove 322 extending downwards from the second member 321 and opening downward. The first and second movable lock members 318 and 321 are formed separately in this example. However, it is possible to form the first and second lock members 318 and 321 as a single integral member.

A clamping bolt 310 passes through the right side tilt elongate hole 308, the telescopic elongate holes 309, the left side tilt elongate hole 308, the bolt holes 320 and 317 of the second and first movable lock members 321 and 318. The clamping bolt 310 has a first (left) side threaded end screwed into a clamping nut 312 fixed to an operating lever 313. A washer 323 is mounted on the clamping bolt 310 between the nut 312 and the first lock member 318. A resilient member 324 such as a coil spring is mounted on the bolt 310 between the operating lever 313 and the first movable lock member 318.

The second (right) side end of the clamping bolt 310 is integrally formed with a circular disc portion 325 having a serrated circumferential surface, and capped with a known rotation preventing stopper member 328 having an adjust stopper 326 engaging with the serrated disc portion 325 and a push nut 327 fastening the adjust stopper 326. The stopper member 328 is engaged in the tilt elongate hole 308 of the second (right) side wall of the upper clamp bracket 301.

A rotation of the operating lever 313 in the tightening (lock) direction causes the nut 312 to shift axially toward the upper clamp bracket 301, which in turn clamps the distance bracket 303. In this case, the tilt locking toothed portions 316 of the first movable lock member 318 engage with the tilt lock toothed portions 314 of the upper clamp bracket 301, and the telescopic locking toothed portion 319 of the second movable lock member 321 engage with the telescopic lock toothed portions 315 of the distance bracket 303. The second movable lock member 321 projects from the first lock member 318, extends through the elongate hole 308 of the first side wall 301a of the upper clamp bracket 301, and engage with the toothed portions 315 of the upper clamp bracket 303.

This lock mechanism can, therefore, prevent the jacket tube 304 from being moved axially or vertically even when the driver collides against the steering wheel, and the steering shaft 306 and the jacket tube 304 receive an axial force and a horizontal force exceeding the clamping force of the bolt 310.

The resilient member 324 provide a proper feeling in tilt and telescopic adjustments, and ensures engagement between the toothed portions 316 and 319 and the toothed portions 314 and 315.

Ninth Embodiment

Figure 31:
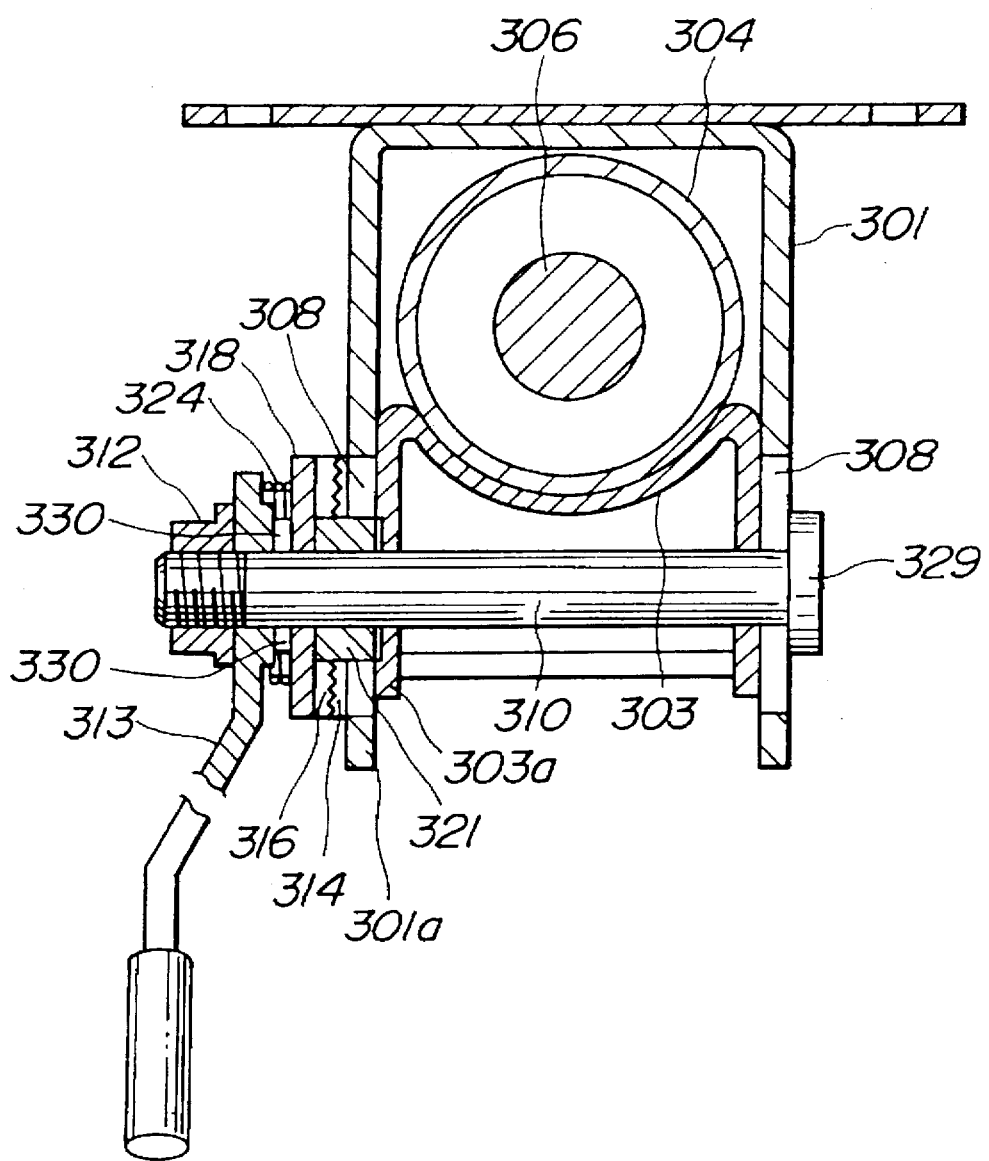
FIG. 31 is a sectional front view showing a tilt and telescopic lock mechanism according to a ninth embodiment of the present invention.
Figure 32:
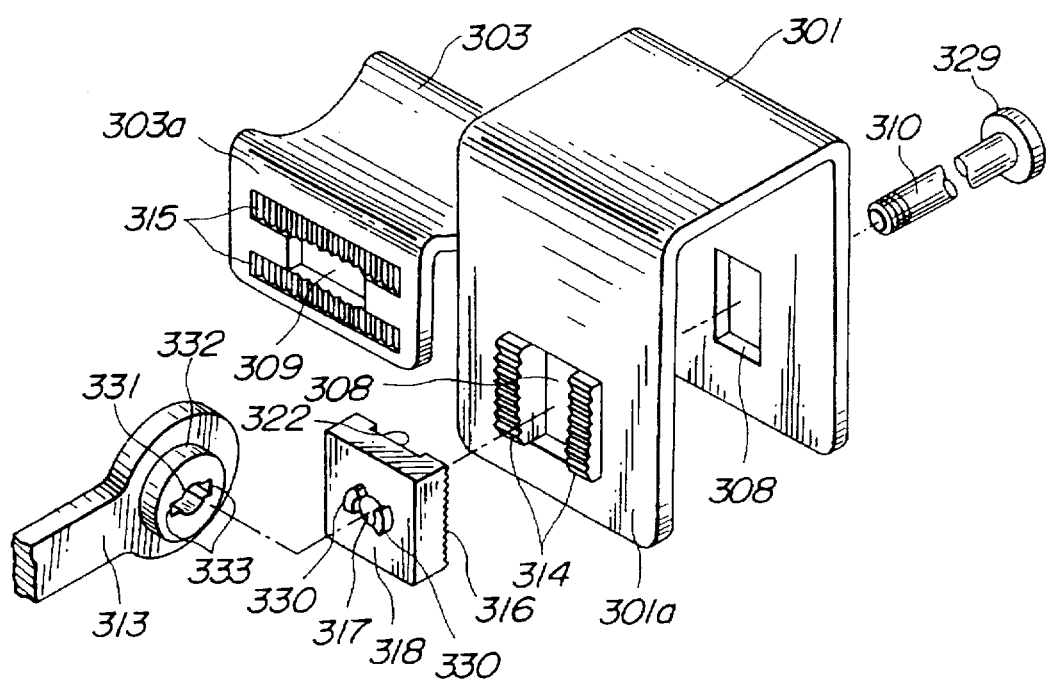
FIG. 32 is an exploded perspective view showing main component parts of the lock mechanism of FIG. 31.
Figure 33:
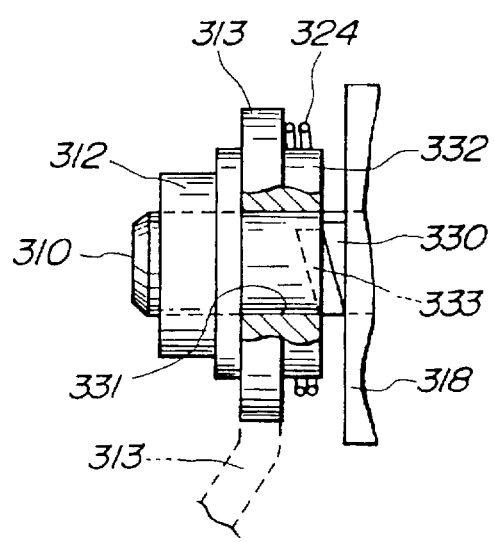
FIG. 33 is a front elevation showing a cam mechanism used in the lock mechanism of FIG. 31.

FIGS. 31–33 show a steering column assembly according to a ninth embodiment of the present invention.

The upper clamp bracket 301, the distance bracket 303 and the first and second movable lock members 318 and 321 shown in FIGS. 31 and 32 are substantially identical to those shown in FIGS. 28–30.

The clamping bolt 310 has the first (left) side threaded end screwed into the clamping nut 312. The first and second movable lock members 318 and 321 are mounted on the clamping bolt 310, and the resilient member 324 such as a coil spring is mounted on the bolt 310 between the operating lever 313 and the first movable lock member 318.

The clamping bolt 310 has a non-serrated bolt head 329 at the second (right) side end. The bolt head 329 has a flat surface which prevents rotation by sliding on the surface surrounding the elongate hole 308, and is movable up and down.

A plurality of cam projections 330 are formed in the first movable lock member 318, as shown in FIG. 32. The cam projections 330 project from the first (left) side surface of the first movable lock member 318 while the toothed portions 316 and the groove 322 are formed on the second (right) side of the first lock member 318. The cam projections 330 are arranged around the bolt hole 317 in a manner of radial symmetry, and bounded between two concentric circles around the bolt hole 317. In this example, there are two of the cam projections 330. Each cam projection 330 has a sloping cam surface.

The operating lever 313 shown in FIG. 32 is formed with a circular raised boss 332 having, at the center, a bolt hole 331 through which the clamping bolt 310 passes. The boss 332 has a plurality of cam recesses 333 corresponding to the cam projections 330 of the first lock member 318. The cam recesses 333 are arranged around the bolt hole 331. Each cam recess 333 has a sloping cam surface. The shape of the cam recesses 333 is complementary to the shape of the cam projections 330. The sloping cam surfaces of the cam projections 330 and the cam recesses 333 are so inclined as to increase the distance between the first lock member 318 and the boss 323 of the operating lever 313 when the operating lever 313 is rotated in the tightening direction, and to allow each cam projection 330 to enter one cam recess deeper when the operating lever 313 is rotated in the loosening direction. In this example, the boss 332 of the operating lever 313 is placed axially between the clamping nut 312 and the first lock member 318.

When the operating lever 313 is rotated in the tightening direction, the cam projections 330 move on the flat end surface of the boss 332 as shown in FIG. 33, the first lock member 318 is pushed toward the upper clamp bracket 301, and the distance bracket 303 is clamped between the left and right side walls of the upper clamp bracket 301. In this case, the toothed portions 316 of the first lock member 318 come in engagement with the toothed portions 314 of the upper clamp bracket 301, and the toothed portions 319 of the second lock member 321 are also brought into engagement with the toothed portions 315 of the distance bracket 303.

The thus-constructed lock mechanism can reliably prevent the jacket tube 304 from being moved axially or vertically even when the driver collides against the steering wheel, and the steering shaft 306 and the jacket tube 304 receive an excessive axial force and an excessive horizontal force.

Tenth Embodiment

Figure 34:
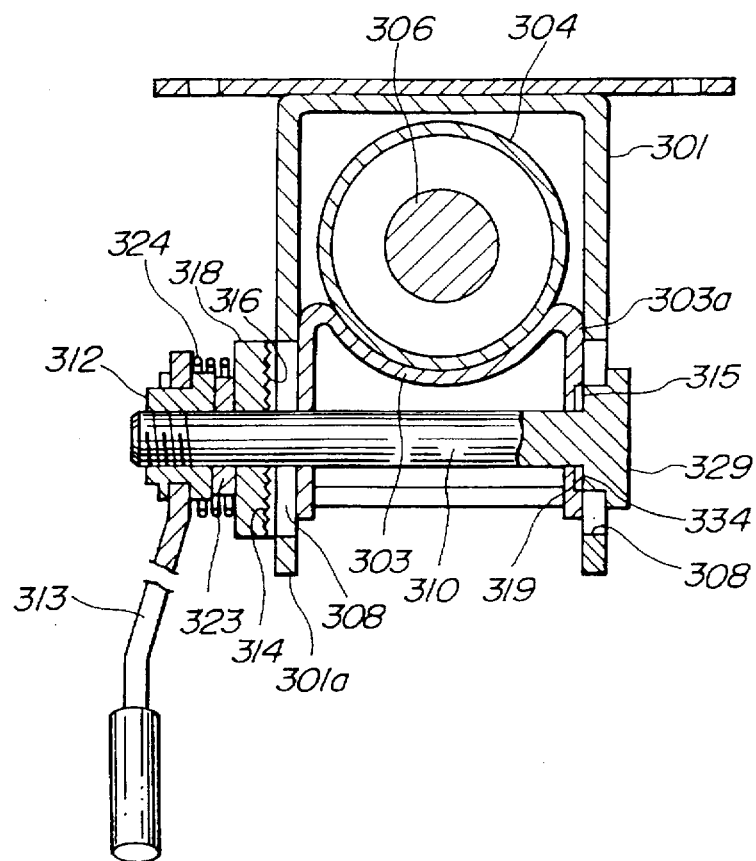
FIG. 34 is a sectional front view showing a tilt and telescopic lock mechanism according to a tenth embodiment of the present invention.
Figure 35:
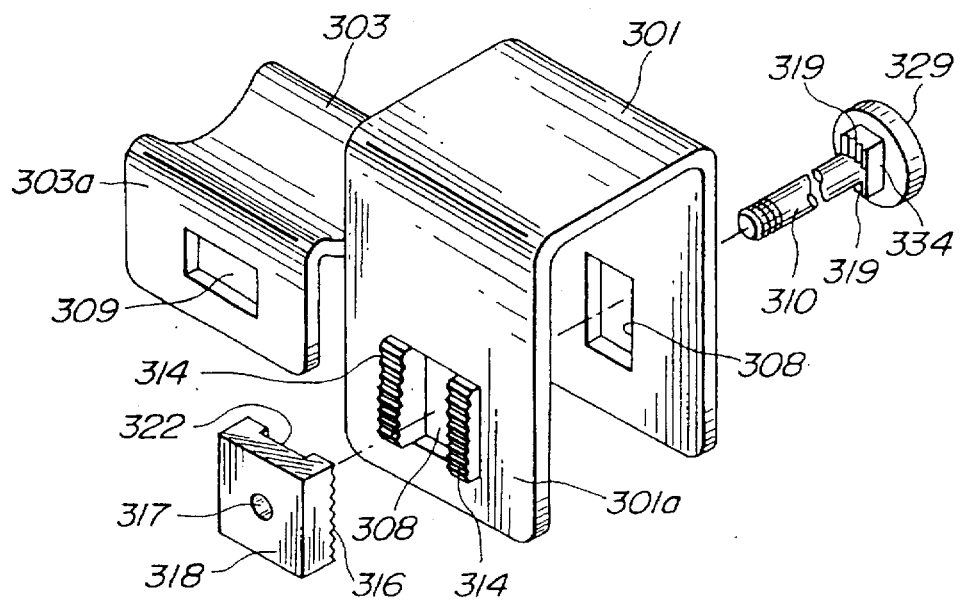
FIG. 35 is an exploded perspective view showing main component parts of the lock mechanism of FIG. 34.

FIGS. 34 and 35 show a steering column assembly according to a tenth embodiment of the present invention.

Telescopic lock toothed portions 315 shown in FIG. 34 are formed in the second (right) side wall of the distance bracket 303, on the upper and lower sides of the elongate hole 309. The first (left) side wall of the distance bracket 303 is flat and plain, as shown in FIG. 35. The toothed portions 315 are depressed below the flat outside surface of the second (right) side wall of the distance bracket 303. The upper clamp bracket 301 is substantially identical to the clamp bracket 301 shown in FIG. 29.

The clamping bolt 310 shown in FIGS. 34 and 35 has a threaded first (left) side-end, and a head 329 at the second (right) side end. The clamping bolt 310 further has a shoulder 334 formed between the head 329 and the shank of the bolt 310. The shoulder 334 has upper and lower telescopic locking toothed portions 319 facing toward the first bolt end on the upper and lower sides of the shank. The shoulder 334 serves as the second movable lock member. In this example, the shoulder 334 is rectangular in cross section. The shoulder 334 is slidably received in the tilt adjustment elongate hole 308 of the second (right) side wall of the upper clamp bracket 301, and shoulder 334 serves as a means for preventing rotation of the bolt 310.

The nut 312 fixedly mounted on the operating lever 313 is screwed onto the threaded first end of the clamping bolt 310. The first movable lock member 318 having the tilt lock toothed portions 316 is mounted on the bolt 310 between the nut 312 and the upper clamp bracket 301, and a washer 323 is mounted on the bolt 310 between the first lock member 318 and the nut 312. The resilient member 324 such as a coil spring is also mounted on the bolt 310 between the operating lever 313 and the first lock member 318.

When the operating lever 313 is rotated in the tightening direction, the nut 312 is displaced toward the bolt head 329, presses the first lock member 318 to the upper clamp bracket 301, and clamps the distance bracket 303 between the left and right side walls of the upper clamp bracket 301. Therefore, as shown in FIG. 34, the toothed portions 316 of the first lock member 318 engage with the toothed portions 314 of the left side wall of the upper clamp bracket 301, while on the other hand, the toothed portions 319 of the shoulder 334 engage with the toothed portions 315 of the right side wall of the distance bracket 303.

This lock mechanism can prevent the jacket tube 304 from being moved axially or vertically even when the driver collides against the steering wheel, and the steering shaft 306 and the jacket tube 304 receive an excessive axial force and an excessive horizontal force.

Eleventh Embodiment

Figure 36:
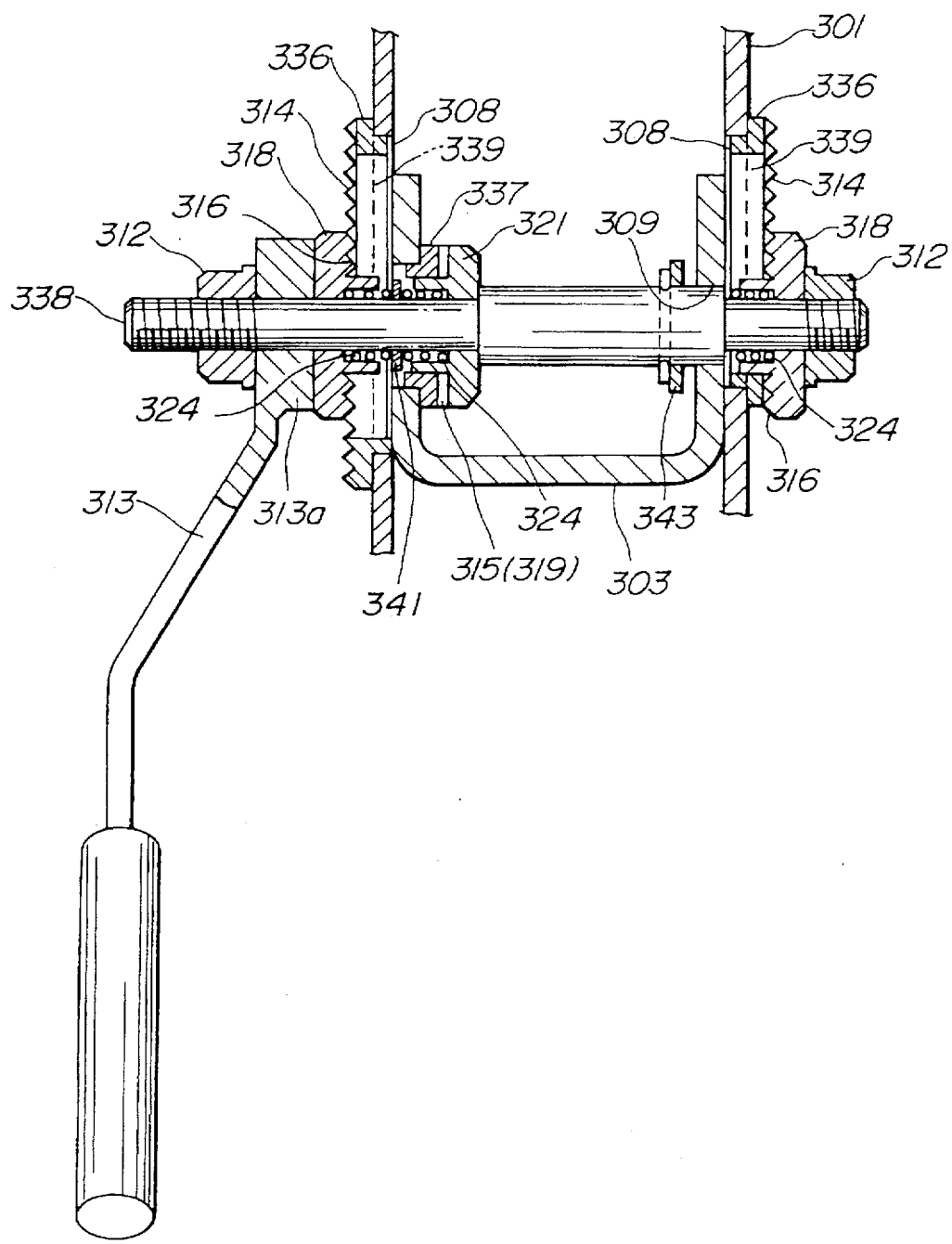
FIG. 36 is a sectional front view showing a tilt and telescopic lock mechanism according to an eleventh embodiment of the present invention.
Figure 37:
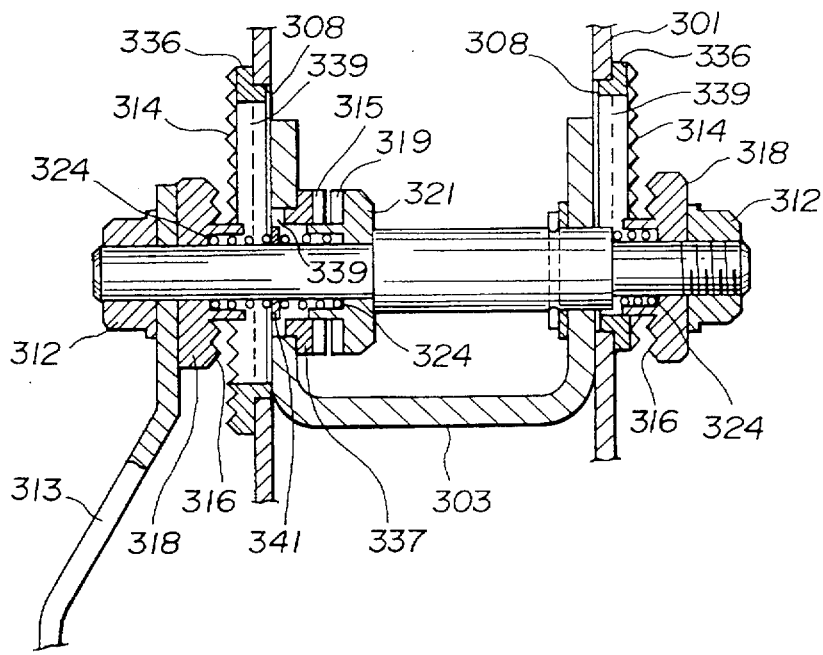
FIG. 37 is a sectional view showing the lock mechanism of FIG. 36 in a released (unlock) state.
Figure 38:
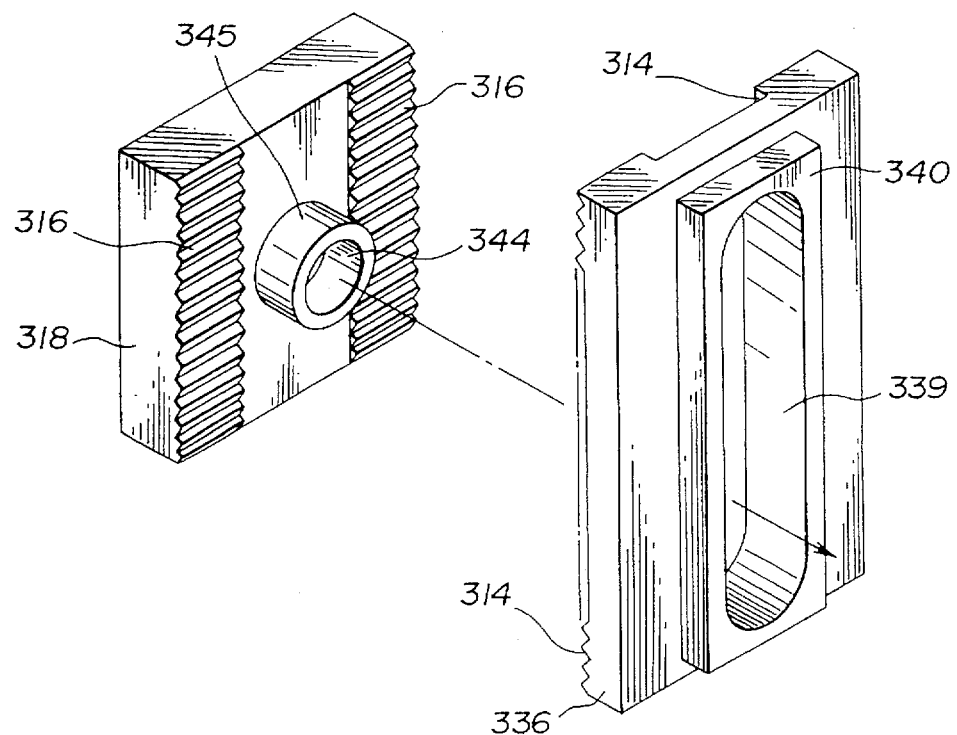
FIG. 38 is an exploded perspective view showing a toothed plate and a lock plate in the lock mechanism of FIG. 36.

FIGS. 36–38 show a steering column assembly according to an eleventh embodiment of the present invention.

Left and right (first and second side) toothed plates 336 are fit from the outside, and fixed, in the tilt adjustment elongate holes 308 of the left and right walls of the upper clamp 301, respectively. An inside lock plate 337 is fit from the inside, and fixed, in the telescopic adjustment elongate hole 309 of the first side wall of the distance bracket 303. The first side is the operating lever's side on which the operating lever 313 exists, and the first side is the left side in the illustrated example.

Each of these three toothed plates 336 and 337 has a toothed portion (314 or 315) on one side, a raised portion 340 on the opposite side, and an elongate hole 339 open in the raised portion 340, as shown in FIG. 38. In this example, the toothed portion consists of first and second toothed portions (314, 315) between which there is formed a rectangular depressed portion. One end of the elongate hole 339 is open in the depressed portion between the first and second toothed raised portions, and the opposite end of the elongate hole 339 is open in the raised portion 340 which is rectangular, and surrounded by a flat surface, in this example. The raised portion 340 is fit in the elongate hole 308 of the upper clamp 301 or the elongate hole 309 of the distance bracket 303. In this example, these three toothed plates 336 and 337 are identical in shape and dimension, and they are interchangeable. In the assembled state, the two toothed plates 336 are upright, and the toothed plate 337 is laid down on one side. Each of teeth formed in the toothed portions 314 of the left and right toothed plates 336 is perpendicular to the longitudinal direction of the elongate hole 308. Each tooth 315 of the inside toothed plate 337 is perpendicular to the longitudinal direction along which the elongate hole 309 is elongated.

As shown in FIGS. 36 and 37, a washer 341 is mounted on the clamping bolt 338. The clamping bolt 338 of this example has a first threaded end and a second threaded end, and a nut 312 is screwed on each of the first and second threaded ends of the clamping bolt 338.

An operating lever 313 has a fulcrum end portion mounted on the clamping bolt 338 between the first nut 312 on the first (left side) threaded end of the clamping bolt 338 and the upper clamp bracket 301.

Each of left and right outside first movable lock members 318 has a toothed portion 316 for engaging with the toothed portion 314 of one of the toothed plates 336. The left outside lock member 318 is mounted on the clamping bolt 338 between the operating lever 313 and the left toothed plate 336 fixed to the outside of the first (left) wall of the upper clamp 301. The right outside lock member 318 is mounted on the clamping bolt 338 between the right side nut 312 on the second threaded end of the bolt 338 and the right toothed plate 336 fixed to the outside of the second wall of the upper clamp 301.

An inside second movable lock member 321 has a toothed portion 319 for engaging with the toothed portion 315 of the inside toothed plate 337 fixed to the inside of the first wall of the distance bracket 303.

The clamping bolt 338 of this example has a middle enlarged section having a larger diameter, a first reduced section having a smaller diameter and extending from the first end (left end) of the middle enlarged section to the first end of the bolt 338, and a second reduced section having a smaller diameter and extending from the second end (right end) of the middle enlarged section to the second end of the bolt 338. In this example, the first (left side) reduced section is longer than the second (right side) reduced section.

A stop washer 343 is mounted on the middle enlarged section of the clamping bolt 338 near the second (left side) end of the middle enlarged section, between the first and second side walls of the distance bracket 303. The second movable lock member 321 is mounted on the first (left side) reduced section of the clamping bolt 338. The axial movement of the second movable lock member 321 toward the second (right) side is limited by the annular step formed between the middle enlarged section and the first reduced section of the clamping bolt 338.

There are further provided three resilient members 324 such as coil springs. The first resilient member 324 is disposed between the left side first movable lock member 318 and the washer 341. The second resilient member 324 is disposed between the washer 341 and the second movable lock member 321. The washer 341 is mounted on the clamping bolt 338 between the left side first movable lock member 318 and the second movable lock member 321, as shown in FIGS. 36 and 37. The third resilient member 324 is between the right side first movable lock member 318 and the second (right side) end of the enlarged section of the clamping bolt 338. These three resilient members 324 are all mounted on the clamping bolt 338.

The fulcrum end of the operating lever 313 has a hole through which the clamping bolt 338 passes, and a cam portion 313a. The cam portion 313a pushes the first (left) side lock member 318 toward the second lock member 321 when the operating lever 313 is rotated in one direction. When the operating lever 313 is rotated in the opposite direction, the camp portion 313a allows the first (left side) lock member 318 to move away from the second lock member 321.

In this example, the lock members 318 and 321 are identical in shape and size and are interchangeable. As shown in FIG. 38, each of the movable lock members 318 and 321 is approximately square and bilaterally symmetrical, and has a collar 345 projecting from the center of one side. The collar 345 of each movable lock member has a through hole 344 through which the clamping bolt 338 passes. Each lock member has first and second lock toothed portions (316) for engaging with the toothed portions of one of the toothed plates 336 and 337. The collar 345 of each lock member 318 or 321 is formed between the first and second toothed portions (316) as shown in FIG. 38. The projecting cylindrical collar 345 of each lock member 318 or 321 is slidably received in the elongate hole 339 of one of the toothed plates 336 and 337. In the assembled state, the angle between the orientation of the second lock plate 321 and the orientation of each lock plate 318 is 90°. That is, the imaginary median plane of the second lock plate 321 is substantially perpendicular to the median plane of each lock plate 318. Each of the resilient members 324 is received in the collar 345 of one of the movable lock members 318 and 321.

When the operating lever 313 is rotated in the tightening direction, the left side first movable lock member 318 is forced toward the upper clamp bracket 301 with the cam portion 313a of the operating lever 313, the distance bracket 303 is clamped between the left and right side walls of the upper clamp bracket 301 as shown in FIG. 36. In this case, the tilt locking toothed portions 316 of the left and right first movable lock members 318 are engaged, respectively, with the tilt lock toothed portions 314 of the left and right toothed plates 336 fixed to the left and right side walls of the upper clamp bracket 301, and the telescopic locking toothed portions 319 of the second movable lock member 321 are engaged with the telescopic lock toothed portions 315 of the inside toothed plate 337 fixed to the distance bracket 303. With this engagement, the lock mechanism can prevent the jacket tube 304 of the steering column from being moved in an axial forward direction or in an up and down direction by firmly gripping the jacket tube 4 even if the driver collides against the steering wheel, and the steering shaft 306 and the jacket tube 304 receive a force having an axial component and a horizontal component exceeding the clamping force of the clamping bolt 338. This lock mechanism locks the steering column with both of the frictional force produced by the clamping bolt and nut, and the engagement of the toothed portions, like the lock mechanisms of the preceding embodiment. Therefore, the locking arrangement is reliable and free from backlash.

When the operating lever 313 is rotated in the opposite loosening direction, each of the movable lock members 318 and 321 moves away from the corresponding toothed plate 336 or 337 by the force of the corresponding one of the resilient members 324, and the toothed portions of each movable lock member 318 or 321 are disengaged from the toothed portions 314 or 315 of the corresponding toothed plate 336 or 337, as shown in FIG. 37. In this released state, the clamping bolt 338 is movable up and down in the elongate holes 339 of the left and right toothed plates 336, and movable horizontally (or axially) in the elongate hole 339 of the toothed plate 337.

Figure 39:
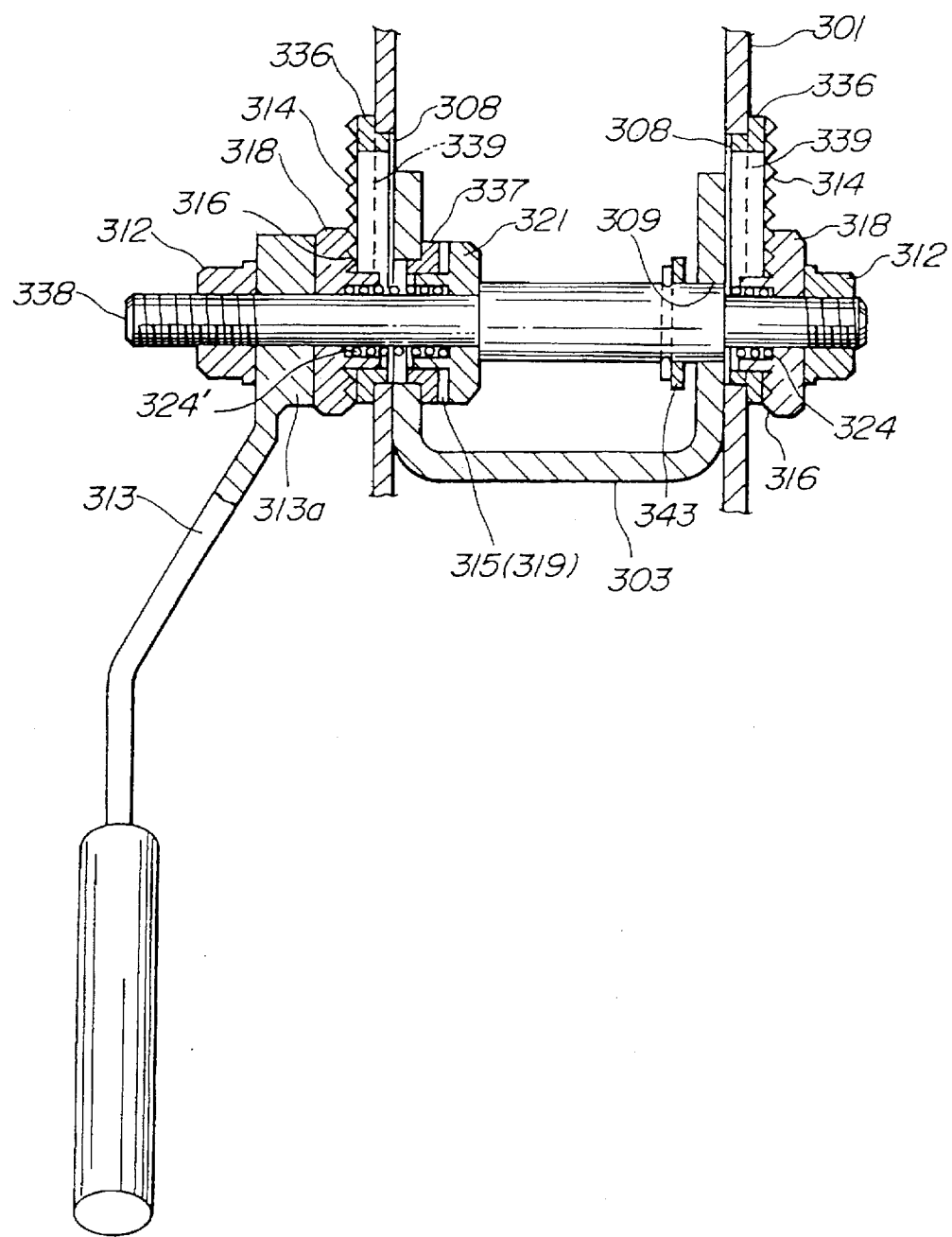
FIG. 39 is a sectional front view showing a variation of the eleventh embodiment of the present invention.

FIG. 39 shows a variation of the steering column assembly shown in FIGS. 36~38 according to the eleventh embodiment. In the assembly shown in FIG. 39, the washer 341 shown in FIG. 36 is eliminated, and instead a single long coil spring 324' is mounted on the clamping bolt 338 between the left side first movable lock member 318 and the second movable lock member 321 so as to urge both movable members 318 and 321 away from each other. The spring 324' extends from a first spring end abutting on the left side first movable member 318, to a second spring end abutting on the second movable member 321. In other respects, the assembly shown in FIG. 39 is substantially identical to the steering column assembly shown in FIGS. 36~38.

In the examples shown in FIGS. 28~38, each of the toothed portions 314, 315, 318 and 319 consists of two separate toothed portions located on opposites sides of the clamping bolt. However, it is optional to form these toothed portions only on one side.

What is claimed is:

1. A steering column assembly for a vehicle, comprising:
   a mounting clamp bracket member having an elongated tilt adjustment hole for allowing tilt adjustment of a steering column, and a tilt lock toothed portion, said mounting clamp bracket member including a clamp bracket comprising first and second side walls each having said elongated tilt adjustment hole, and said clamp bracket including a mounting portion adapted to be fixed to a vehicle body;
   a movable column support member positioned between said first and second side walls of said clamp bracket, and having a supporting portion for supporting said steering column and a bolt hole;
   a clamping bolt passing through said elongated tilt adjustment hole and said bolt hole;
   a lever member having a pushing portion mounted on said clamping bolt for clamping said column support member to said mounting bracket member;
   a tilt lock member mounted on said clamping bolt and having a tilt locking toothed portion for engaging with said tilt lock toothed portion of said mounting bracket member;
   a resilient member positioned to bias said tilt lock member away from said mounting bracket member; and
   a clamping nut mounted on said clamping bolt;
   wherein said pushing portion of said lever member is formed with a cam surface for pushing said tilt lock member toward said mounting bracket member when said lever member is rotated in a predetermined direction,
   wherein said tilt lock member comprises a lock plate formed with said toothed portion of said tilt lock member, said lock plate having a circular bolt hole for receiving said clamping bolt, said tilt lock member being mounted on said clamping bolt and axially movable between a lock position in which said toothed portion of said lock plate is engaged with said tilt lock toothed portion of said mounting bracket member, and an unlock position in which said toothed portion of said lock plate is disengaged from said tilt lock toothed portion of said mounting bracket member, and
   wherein said pushing portion of said lever member is placed between said tilt lock member and said clamping nut mounted on said clamping bolt.

2. A steering column assembly as claimed in claim 1, wherein said column support member is adapted to be fixed to said steering column.

3. A tilt steering column assembly for a vehicle, comprising:
   a mounting clamp bracket member having an elongated tilt adjustment hole for allowing tilt adjustment of a steering column, and a tilt lock toothed portion, said mounting clamp bracket member including a clamp bracket comprising first and second side walls each formed with said elongated tilt adjustment hole, and said clamp bracket including a mounting portion adapted to be fixed to a vehicle body;
   a movable column support member positioned between said first and second walls of said clamp bracket, and having a supporting portion for supporting said steering column and a bolt hole;
   a clamping bolt passing through said elongated tilt adjustment hole of said mounting bracket member and said bolt hole of said movable support member;
   a lever member having a pushing portion mounted on said clamping bolt for clamping said movable support member to said mounting bracket member; and
   a tilt lock member mounted on said clamping bolt, the lock member having a tilt locking toothed portion for engaging with said tilt lock toothed portion of said mounting bracket member when said movable support member is clamped to said mounting bracket member,
   wherein said tilt lock member includes a cam portion and said lever member includes a cam portion, which is engaged with said cam portion of said tilt lock member at least when said movable support member is clamped to said mounting bracket member,
   wherein said elongated tilt adjustment hole of said mounting bracket member is in a form of a slot, allowing said clamping bolt to move along a predetermined path along said slot, and
   wherein said tilt lock member has a circular bolt hole for receiving said clamping bolt and substantially immobilizing said clamping bolt from moving relative to said tilt lock member when said lever member is rotated to a predetermined position.

4. A steering column assembly as claimed in claim 3, wherein said column support member is adapted to be fixed to said steering column.

5. A steering column assembly as claimed in claim 3,
wherein said pushing portion of said lever member comprises a clamping nut screwed on said clamping bolt, and formed with said cam portion of said lever member, wherein said tilt lock member comprises a toothed tilt lock plate having said tilt locking toothed portion of said tilt lock member, and a cam plate for holding said tilt lock plate and rotating with said lever member, said tilt lock plate being loosely received in said elongated tilt adjustment hole of said mounting bracket member, and said cam plate being interposed between said tilt lock plate and said lever member, and formed with said cam portion defining a cam hole, wherein said tilt lock toothed portion is formed in a side edge defining said elongated tilt adjustment hole formed in said first side wall, and said movable support member is clamped between said first and second walls of said clamp bracket when said clamping nut of said lever member is tightened on said clamping bolt, and wherein said lever member comprises an operating lever having a lever end for turning said clamping nut.

6. A steering column assembly as claimed in claim 5,
wherein said cam portion of said lever member includes a plurality of cam projections each having a cam surface, and said cam plate includes a plurality of tongues protruding radially inwardly in said cam hole, each having a cam surface for sliding on one of the cam surfaces of said lever member, said cam surfaces of said lever member and said cam plate being inclined so that one of said cam surfaces of said lever member slides on one of said cam surfaces of said cam plate and pushes said cam plate toward said mounting bracket member when said lever member is rotated in a predetermined tightening direction, wherein said cam plate is loosely mounted on said clamping bolt, and said cam plate includes left and right flanges for holding and rotating said tilt lock plate while allowing said tilt lock plate to move up and down relative to said cam plate, and wherein said tilt lock plate includes an elongated hole for receiving said clamping bolt and allowing said tilt lock plate to move up and down relative to said clamping bolt.

7. A steering column assembly as claimed in claim 6,
wherein said bolt hole of said movable column support member is elongated for allowing telescopic adjustment of the steering column, and said column support member includes a telescopic lock toothed portion extending along the bolt hole of said column support member, and wherein said steering column assembly further comprises a pin holder loosely mounted on said clamping bolt, a telescopic lock pin for engaging with said telescopic lock toothed portion of said column support member, and a resilient member disposed between said pin holder and said lever member.

8. A steering column assembly comprising:
an upper mounting clamp bracket member having a tilt adjustment hole, which is elongated to allow tilting adjustment of a steering column, and a tilt lock toothed portion, said upper mounting clamp bracket member comprising first and second side walls each formed with said elongated tilt adjustment hole and a mounting portion adapted to be fixed to a vehicle body;

a distance bracket member positioned between said first and second side walls of said upper mounting bracket clamp member and having a supporting portion for supporting said steering column, a telescopic adjustment hole, which is elongated to allow telescopic adjustment of said steering column, and a telescopic lock toothed portion;

a clamping bolt extending through said elongated tilt adjustment hole and said elongated telescopic adjustment hole;

an operating lever mounted on said clamping bolt for clamping said distance bracket member to said upper mounting clamp bracket member; and a locking means mounted on said clamping bolt and having a tilt locking toothed portion for engaging with said tilt lock toothed portion of said upper clamp bracket member, and a telescopic locking toothed portion for engaging with said telescopic lock toothed portion of said distance bracket member.

9. A steering column assembly as claimed in claim 8, wherein said column support member is adapted to be fixed to said steering column.

10. A steering column assembly as claimed in claim 8, wherein said locking means includes a first bolt hole receiving said clamping bolt.

11. A steering column assembly as claimed in claim 10,
wherein said locking means includes a first lock member formed with said tilt locking toothed portion and mounted on said clamping bolt between said operating lever and said first side wall of said upper mounting bracket member, wherein said operating lever includes a fulcrum portion mounted on said clamping bolt for pushing said lock member toward said first side wall of said upper mounting bracket member, wherein said lock member has said first bolt hole receiving said clamping bolt and prevents said clamping bolt from moving along said elongated tilt adjustment hole of said upper mounting bracket member when said tilt locking toothed portion of said lock member is engaged with said tilt lock toothed portion of said upper mounting bracket member.

12. A steering column assembly as claimed in claim 11,
wherein said tilt lock toothed portion is positioned adjacent said elongated tilt adjustment hole of said first side wall of said upper mounting bracket member, and wherein said tilt lock toothed portion of said upper mounting bracket member is formed with teeth for preventing said tilt locking toothed portion of said lock member from moving along said elongated tilt adjustment hole, and said telescopic lock toothed portion of said distance bracket member is formed with teeth for preventing said telescopic locking toothed portion of said locking means from moving along said elongated telescopic adjustment hole.

13. A steering column assembly as claimed in claim 12, wherein a resilient member is disposed between said lock member and said operating lever.

14. A steering column assembly as claimed in claim 12, wherein said distance bracket member comprises first and second side walls slidably positioned between said first and second side walls of said upper mounting bracket member, said telescopic lock toothed portion being positioned in one of said first and second side walls of said distance bracket member.

15. A steering column assembly as claimed in claim 14:
wherein said tilt lock toothed portion of said upper clamp bracket member has first and second toothed portions between which said elongated tilt lock hole of said first side wall of said upper mounting bracket member is formed, wherein said telescopic lock toothed portion of said distance bracket member has first and second toothed portions between which said elongated telescopic adjustment hole is formed, wherein said tilt locking toothed portion of said lock member has first and second toothed portions for engaging with said first and second toothed portions of said tilt lock toothed portion of said upper mounting bracket member, wherein said first bolt hole in said lock member is formed between said first and second toothed portions of said tilt locking toothed portion of said lock member, wherein said telescopic locking toothed portion of said locking means has first and second toothed portion for engaging with said first and second toothed portions of said telescopic lock toothed portion of said distance bracket member, and wherein said lock member further has said first and second toothed portions of said telescopic locking toothed portion of said locking means.

16. A steering column assembly as claimed in claim 15:

wherein said lock member is removably received in said elongated tilt adjustment hole of said upper mounting clamp bracket member, and said telescopic locking toothed portion thereof is moved in an axial direction of said clamping bolt through said elongated tilt adjustment hole into and out of engagement with said telescopic lock toothed portion of said distance bracket member, wherein said first side wall of said distance bracket member has a smooth outside surface in sliding contact with a smooth inside surface of one of said first and second side walls of said upper mounting clamp bracket member, and wherein said telescopic lock toothed portion of said distance bracket member is formed in said first side wall of said distance bracket member and has depressed teeth below said outside surface of said first side wall of said distance bracket member.

17. A steering column assembly as claimed in claim 16, wherein said lock member has said first and second toothed portions of said tilt locking toothed portion, said first bolt hole, said first and second toothed portions of said telescopic locking toothed portion, and a second bolt hole.

18. A steering column assembly as claimed in claim 17:

wherein said smooth outside surface of said first side wall of said distance bracket member is flat, said teeth of said telescopic toothed portion of said distance bracket member are parallel to an imaginary straight line that is parallel to said smooth outside surface of said first side wall of said distance bracket member and perpendicular to a direction along which said elongated telescopic adjustment hole is elongated, wherein said tilt lock toothed portion has teeth that are parallel to an imaginary straight line, which is parallel to a flat outside surface of said first wall of said upper mounting bracket member and perpendicular to a direction along which said elongated tilt adjustment elongate hole is elongated, and wherein said lock member comprises a first movable member formed with said first and second toothed portions of said tilt locking toothed portion and said first bolt hole, and a second movable member mounted on said first movable member and formed with said first and second toothed portions of said telescopic locking toothed portion, and said second bolt hole.

19. A steering column assembly as claimed in claim 18, wherein said lock member includes a cam portion facing toward said fulcrum portion of said operating lever, and said fulcrum portion of said operating lever comprises a cam portion for pushing said cam portion of said lock member toward said first side wall of said upper clamp bracket member when said operating lever is rotated in a predetermined direction.

20. A steering column assembly as claimed in claim 18:

wherein said clamping bolt has a threaded first bolt end and a clamping nut is screwed on said first bolt end, and has a second bolt end having a bolt head, and said second side wall of said upper clamp bracket member is placed between said bolt head and said distance bracket member, wherein said fulcrum portion of said operating lever is shaped to be gripped to turn said clamping nut, wherein a resilient member is disposed between said operating lever and said first movable member, wherein said bolt head of said clamping bolt is engaged with a rotation preventing stopper member, which is slidably received in said elongated tilt adjustment hole of said second side wall of said upper clamp bracket member.

21. A steering column assembly as claimed in claim 20:

wherein said locking means includes a shoulder formed in said clamping bolt between said bolt head and a shank of said clamping bolt, which is slidably received in said elongated tilt adjustment hole of said second side wall of said upper clamp bracket and formed with said telescopic locking toothed portion, wherein said first side wall of said distance bracket member formed with said telescopic lock toothed portion faces toward said second side wall of said upper clamp bracket member, and wherein said shoulder is integral with said clamping bolt and has a noncircular cross section, said shoulder preventing rotation of said clamping bolt by being engaged in said elongated tilt adjustment hole of said second side wall of said upper clamp bracket member.

22. A steering column assembly as claimed in claim 14:

wherein said tilt lock toothed portion of said upper mounting bracket member has first and second toothed portions between which said elongated tilt lock hole of said first side wall of said upper mounting bracket member is formed, wherein said telescopic lock toothed portion of said distance bracket member has first and second toothed portions between which said elongated telescopic adjustment hole is formed, wherein said tilt locking toothed portion of said lock member has first and second toothed portions for engaging with said first and second toothed portions of said tilt lock toothed portion of said upper mounting bracket member, wherein said first bolt hole in said lock member is formed between said first and second toothed portions of said tilt locking toothed portion of said lock member, wherein said telescopic locking toothed portion of said locking means has first and second toothed portion for engaging with said first and second toothed portions of said telescopic lock toothed portion of said distance bracket member, and wherein said locking means further includes a second lock member having a second bolt hole for receiving said clamping bolt, said second lock member having said first and second toothed portions of said telescopic locking toothed portion, said second bolt hole being formed between said first and second toothed portions of said telescopic locking toothed portion of said second lock member.

23. A steering column assembly as claimed in claim 22:

wherein said first lock member is movably mounted on said clamping bolt between said operating lever and said first side wall of said upper mounting bracket member, wherein said second lock member is mounted on said clamping bolt between said first and second side walls of said distance bracket member, and wherein said telescopic lock portion of said distance bracket member is located between said first and second side walls of said distance bracket member.

24. A steering column assembly as claimed in claim 22:

wherein said upper mounting clamp bracket member comprises a clamp bracket having said first and second side walls of said upper clamp bracket member, and a first toothed plate formed with said tilt lock toothed portion and removably connected to said first side wall of said clamp bracket with said tilt lock toothed portion on the outside surface of said first side wall of said clamp bracket, wherein said distance bracket member comprises a distance bracket having said first and second side walls of said distance bracket member and a second toothed plate formed with said telescopic lock toothed portion and removably connected to said distance bracket, and wherein said first and second toothed plates are identical in shape and size, and are interchangeable with each other.

25. A steering column assembly as claimed in claim 24, wherein each of said first and second toothed plates has an elongated hole receiving said clamping bolt and a raised portion fit in one of said elongated tilt adjustment hole and said elongated telescopic adjustment hole.

26. A steering column assembly as claimed in claim 25:

wherein said second toothed plate is removably connected to said first side wall of said distance bracket with said telescopic lock toothed portion on an inside surface of said first side wall of said distance bracket, wherein said first lock member is movably mounted on said clamping bolt between said operating lever and said first side wall of said clamp bracket and said second lock member is movably mounted on said clamping bolt between said first and second side walls of said distance bracket, and wherein said first and second lock members are identical in shape and size, and interchangeable with each other.

27. A steering column assembly as claimed in claim 26:

wherein said clamping bolt includes a first stepped surface facing toward said first side wall of said distance bracket and abutting on said second lock member, and a second stepped surface adjacent said second side wall of said distance bracket, and wherein a resilient member is disposed between said first and second lock members so as to urge said first and second lock members away from each other.

28. A steering column assembly as claimed in claim 27:

wherein said upper mounting clamp bracket member further includes a third toothed plate formed with said tilt lock toothed portion and removably connected to said second side wall of said clamp bracket, with said tilt lock toothed portion on the outside surface of said first side wall of said clamp bracket, said third toothed plate being identical and interchangeable with said first toothed plate, and wherein said locking means further includes a third lock member formed with said tilt locking toothed portion and removably mounted on said clamping bolt between said third toothed plate and one end of said clamping bolt.

29. A steering column assembly as claimed in claim 28:

wherein said resilient member comprises a first side coil spring mounted on said clamping bolt between said first and second lock members for urging said first and second lock members away from each other, said first side coil spring continuously extending from a first spring end, abutting on said first lock member to a second spring end, abutting on said second lock member, and a second side coil spring mounted on said clamping bolt between said third lock member and said second stepped surface so as to urge said third lock member away from said third toothed plate, and wherein said clamping bolt has a threaded first bolt end and a threaded second bolt end, a first nut being screwed on said first bolt end of said clamping bolt and a second nut being screwed on said second bolt end of said clamping bolt.

30. A steering column assembly as claimed in claim 28:

further comprising a washer mounted on said clamping bolt between said first and second movable members, said resilient member comprising a first coil spring mounted on said clamping bolt between said first lock member and said washer for urging said first lock member away from said first toothed plate, a second coil spring mounted on said clamping bolt between said second lock member and said washer for urging said second lock member away from said second toothed plate, and a third coil spring mounted on said clamping bolt between said third lock member and said second stepped surface so as to urge said third lock member away from said third toothed plate, and wherein said clamping bolt has a threaded first bolt end and a threaded second bolt end, a first nut being screwed on said first bolt end of said clamping bolt and a second nut being screwed on said second bolt end of said clamping bolt.

\* \* \* \* \*